(12) United States Patent
Bronte et al.

(10) Patent No.: US 11,694,448 B2
(45) Date of Patent: Jul. 4, 2023

(54) CAMERA MONITORING SYSTEM FOR MOTOR VEHICLES

(71) Applicant: Ficosa Adas, S.L.U., Barcelona (ES)

(72) Inventors: Victor Iglesias Bronte, Barcelona (ES); Daniel Abad Garcia, Barcelona (ES); Jordi Vila Planas, Barcelona (ES); Juan Antonio Nuñez, Barcelona (ES)

(73) Assignee: FICOSA ADAS, S.L.U., Barcelona (ES)

( * ) Notice: Subject to any disclaimer, the term of this patent is extended or adjusted under 35 U.S.C. 154(b) by 0 days.

(21) Appl. No.: 17/473,194

(22) Filed: Sep. 13, 2021

(65) Prior Publication Data

US 2022/0083794 A1 Mar. 17, 2022

(30) Foreign Application Priority Data

Sep. 11, 2020 (EP) .................................... 20382801

(51) Int. Cl.
*G06V 20/59* (2022.01)
*G06V 40/20* (2022.01)
*B60R 11/04* (2006.01)
*G06F 3/01* (2006.01)
*B60R 11/00* (2006.01)

(52) U.S. Cl.
CPC .............. *G06V 20/59* (2022.01); *B60R 11/04* (2013.01); *G06F 3/017* (2013.01); *G06V 40/28* (2022.01); *B60R 2011/0019* (2013.01)

(58) Field of Classification Search
CPC ........... G06V 20/59; B60R 11/04; B60R 1/00; G06F 3/017
See application file for complete search history.

(56) References Cited

U.S. PATENT DOCUMENTS 8,947,532 B2 2/2015 Augst
9,073,493 B1 7/2015 Yun et al.
(Continued)

FOREIGN PATENT DOCUMENTS

| DE | 102007044536 A1 | 3/2009 | |
| EP | 2743133 A2 * | 6/2014 | ............... B60R 1/00 |
| WO | 2016178190 A1 | 11/2016 | |

OTHER PUBLICATIONS

Extended European Search Report for Application No. 20382801.7, dated Nov. 2, 2020, 7 pages.

*Primary Examiner* — Rowina J Cattungal
(74) *Attorney, Agent, or Firm* — Brooks Kushman P.C.

(57) ABSTRACT

A camera monitoring system for motor vehicles is provided. An image capturing device is provided on a mounting assembly of the vehicle for an exterior field of view (FOV) of the vehicle extending sideward and rearward outside the vehicle and encompassing a portion of the exterior part of the vehicle. An electronic control unit (ECU) is connected to the image capturing device to obtain a captured image. An electronic display device is connected to the ECU and is located inside the vehicle and to be used by a driver. A gesture detector is configured to obtain at least one position of at least one part of the driver's body. The ECU is configured to adjust the FOV based on the obtained position and the display device is configured to display the adjusted FOV in a displayed image region, which can be moved within the captured image.

18 Claims, 15 Drawing Sheets

(56) References Cited

U.S. PATENT DOCUMENTS

| | | | |
|---|---|---|---|
| 2008/0278821 A1* | 11/2008 | Rieger | H04N 13/344 359/630 |
| 2009/0058845 A1* | 3/2009 | Fukuda | B60K 35/00 345/214 |
| 2010/0182432 A1* | 7/2010 | Augst | B60R 1/12 348/148 |
| 2013/0038732 A1* | 2/2013 | Waite | B60R 1/00 348/148 |
| 2016/0137126 A1* | 5/2016 | Fürsich et al. | H04N 23/698 348/148 |
| 2017/0166131 A1* | 6/2017 | Oba | H04N 5/268 |
| 2018/0050639 A1 | 2/2018 | Eberhard et al. | |
| 2018/0134217 A1* | 5/2018 | Peterson | G06V 20/58 |
| 2018/0304814 A1 | 10/2018 | Tschirhart | |
| 2019/0075253 A1* | 3/2019 | Wada | H04N 7/183 |
| 2019/0197327 A1 | 6/2019 | Mangla et al. | |
| 2020/0231091 A1 | 7/2020 | Hayashida et al. | |

\* cited by examiner

CAMERA MONITORING SYSTEM FOR MOTOR VEHICLES

CROSS-REFERENCE TO RELATED APPLICATIONS

This application claims priority to EP application Serial No. 20382801.7 filed Sep. 11, 2020, the disclosure of which is hereby incorporated in its entirety by reference herein.

TECHNICAL FIELD

The present invention has its application within the control systems for motor vehicles comprising electronic (interior and/or exterior) rear-view mirror assemblies.

The present invention relates to a camera monitoring system (CMS) to manage the field of view from one or more rear-view mirrors displayed to the driver of a vehicle by the driver's gesture detection.

BACKGROUND

A problem of the prior art in the field of motor vehicles is adjusting the field of view while driving.

U.S. Pat. No. 9,073,493B1 discloses a method and apparatus for adjusting the view mirror in vehicle, by (i) obtaining a first angle of the view mirror; (ii) capturing an image of a head of a driver; (iii) determining the perpendicular distance of the view mirror (iv) calculating a view angle based on the viewing distance and the perpendicular distance; and (v) adjusting the view mirror from the first angle to the second angle. U.S. Pat. No. 9,073,493B1 solves the technical problem of adjusting the field of view when driving by the determining the position of the driver. However, the adjustment is made by using an actuator to rotate the side-mirror. A mechanical actuator entails cost, complexity and likelihood of damage over time.

It is also found that drivers may wish to move their head forward, particularly when overtaking, in order to reduce the blind spot zone. In doing so, to have an enlarged view of the blind spot zone, drivers increase the relative angle of their head with respect to the image capturing device (e.g., a reflective rear-view mirror in conventional mirror systems of vehicles, or a camera in digital vision systems for vehicles). However, in conventional reflective mirrors, the aperture angle ($\alpha$) unfortunately decreases with increasing the relative angle of the driver's head with respect to the image capturing device. The aperture angle ($\alpha$) may be defined as the angular extent (from a top view) of a given scene (captured image region) which is captured by the image capturing device. The aperture angle ($\alpha$) is translated into a horizontal length of the captured image region from the driver's point of view (on a mirror or on a display).

Therefore, it is highly desirable to provide a motor vehicle with a control system monitoring the intelligent rear-view mirror system(s) to change the field of view of the rear-view mirror(s) with nor mechanical nor manual actuation and without touching any display. More particularly, it is an object of the present invention to enhance the driver's visibility of the exterior scenes by providing a visual system with at least an exterior rear-view mirror that allows the exterior field of view to be adjusted by moving the driver's head. In order to cause a better view for the driver and particularly to minimize the blind spot zone when overtaking, an improved field of view of the lateral adjacent area of the driver's vehicle is needed.

SUMMARY

The present invention solves the aforementioned problems and overcomes previously explained state-of-art work limitations by providing a camera monitoring system (CMS) for motor vehicles which provides at least a display device configured to display images captured from an electronic (exterior and/or side) rear-view mirror of the motor vehicle into an electronic display. Specifically, the proposed CMS is capable of adjusting the field of view (FOV) of the rear-view mirror based on the position of at least one part of the user's body (e.g., the driver's head) without touching the display. Head/body movements (or a change in head/body position) may be detected by a sensor which may be based on different technologies (ultrasound, image, Time of Flight (TOF), radar, etc.). The electronic display may refer to a screen (preferably, a touchless screen) or to a display glass.

An aspect of the present invention refers to a camera monitoring system for motor vehicles which comprises:

Image capturing device (e.g., a camera) mounted on a mounting assembly (e.g., a winglet or a sharkfin) which is lubricated at an exterior part of the vehicle. The image capturing device is configured to capture an image from an exterior field of view of the vehicle, the field of view (FOV) extending at least rearward (and preferably extending sideward too) outside the vehicle and encompassing a portion of the exterior part of the vehicle (preferably, an exterior lateral part or side of the vehicle).

An electronic control unit or ECU, which is connected to the image capturing device. The ECU is configured to select one or more image regions (of the exterior FOV) from the image captured by the image capturing device. The image region selected by the ECU can be either the whole captured image or be smaller (called "crop") than the captured image (and in this case, preferably, the ECU can perform "digital panning"; i.e., the selected image region can be moved within the captured image).

At least one electronic display device located inside the vehicle and to be used by the driver (so, the display is located in a visible area for the driver, such as in the door for example). The display device is connected to the ECU and configured to display the image region of the exterior FOV selected by the ECU.

Additionally, the camera monitoring system further comprises a gesture detector to obtain/detect positions of at least one part of the driver's body (e.g., head or face) so that the ECU can adjust (and optionally move, if "pan" is configured) the image region of the exterior FOV to be displayed by the driver's electronic display device based on the position(s) obtained by the gesture detector.

Another aspect of the present invention refers to a motor vehicle comprising two camera monitoring systems (CMS) as described above, wherein one CMS is located on the left side of the vehicle (with image capturing device associated with the exterior rear-view mirror(s) of the left side), and the other CMS is located on the right side of the vehicle (with image capturing device associated with the exterior rear-view mirror(s) of the right side), and further comprising an interior rear-view mirror system (IRMS), and the ECU of the vehicle being the one controlling all the two camera monitoring and the interior rear-view mirror systems. Both CMSs and the IRMS work with the symmetric image of the image from the exterior FOV of the vehicle captured by the image capturing device, so the captured image refers to the symmetric image of the raw captured image.

The symmetric image can be obtained by: (i) the image sensor of the camera, (ii) the ISP of the camera, or (iii) the ECU of the vehicle. Option (i) allows to obtain the captured image directly from the camera thanks to its hardware architecture. Options (ii) and (iii) involve image processing to obtain the captured image within the image region can be moved by gestures.

As for the camera capturing the (raw) captured image, in the case of CMS, the camera is on the side of the vehicle (e.g., in a "winglet" mounting assembly); in the case of IRMS, the camera is on the roof of the vehicle (e.g., in a "sharkfin" mounting assembly); and in the case that the FOV monitoring is used for parking, the camera for parking (cameras of this type are also called rear backup camera) in the rear bumper of the vehicle is used.

The present invention can be applied to control an interior rear-view mirror (IRMS) or any other electronic mirror on the motor vehicle. The proposed CMS can manage the FOV of the rear-view mirror without touching the display (i.e., through a touchless screen of the display device) by using a gesture detection technology. The touchless screen (e.g., located at the door of the vehicle) may be implemented in different ways such as: i) by increasing the capacity sensibility of the screen (no camera is used), ii) by using a camera, for example, based on image-classifiers.

The present invention can be applied to control any exterior rear-view mirror of the (left or right) side of the vehicle without reducing the aperture angle ($\alpha$) of the FOV displayed to the driver (image region) when the position of the driver's head changes. This solves the handicap of conventional reflective mirrors or digital vision systems emulating a conventional reflective mirror explained in the prior-art: reduction of the aperture angle ($\alpha$) causes an undesired reduction of the view of the blind spot zone; the aperture angle ($\alpha$) being defined as the angular extent of the displayed FOV; i.e., the displayed image region (crop). For this purpose, the present invention is configured at least to:
  (i) keep fixed the aperture angle ($\alpha$) of the image region being thus independent of the detected relative angle of the driver's head with respect to the image capturing device associated with the exterior rear-view mirror (ERMS) located at the driver's side of the vehicle; or
  (ii) increase the aperture angle ($\alpha$) of the image region as the relative angle of the driver's head with respect to the aforementioned image capturing device increases.

According to a first embodiment of the present invention, the Camera Monitoring System (CMS) is configured to select just one single image region (the "crop") so that the selected image region can be moved within the captured image based on changes in the position of the head/face or any movement of the driver's body (preferably, torso, head and/or hands). The Field of View (FOV) of an electronic rear-view mirror shown to the driver by the display is thereby adjusted. Moving the crop is also known as "pan" or "digital panning". According to this embodiment, the CMS is further configured to keep fixed the aperture angle ($\alpha$) of the selected image region being thus independent of the detected relative angle of the driver's head with respect to the CMS (i.e., the display device).

Preferably, the image region (the "crop") selected by the ECU of the CMS is off-center (not centered) on the captured image, but is located at an inner, right or left, side of the captured image: the right side of the image if the crop is displayed by a display device located in the left part of the vehicle (the driver's display for right-hand traffic) or the left side if the crop is displayed by a display device located in the right part of the vehicle. Therefore, the driver is provided with a path on the display to move the selected image region outwardly along the horizontal axis of the captured image and the non-centered location of the crop is to maximize its available path to be movable on the display. More preferably, the length of the path is at least 20% of the length of the selected image region before starting the movement (i.e., displacement). More preferably, the length of the path is at least twice as long as length of the space defined at the other side of the selected region (the "crop"). The skilled person recognizes that the size of the raw image captured by the image capturing device (i.e., camera) may be a limitation. The aperture angle ($\alpha$) of the image region may depend on the lens and the image sensor (i.e., imager) of the camera. A wider aperture angle ($\alpha$) of the image region may be achieved by a lens including a curved surface or increasing the size of the image sensor. A lens including a curved surface may cause distorted images. It may be needed image processing to correct distorted images. Thus, it is particularly advantageous the crop (image region) is not centered on the captured image so as to maximize the above-mentioned available path.

According to a second embodiment of the present invention, the ECU of the camera monitoring system is configured to select two image regions (crops): a first image region (i.e., the first crop) of the captured image and a second image region (i.e., the second crop) which is an additional extended view, wherein the additional extended view is next to the first image region (i.e., the first crop), forming a total image region defined as the first crop joined to the second crop. The second crop is further configured to be expanded and/or retracted based on changes in the position of the head/face or any movement of the driver's body (preferably, torso, head and/or hands). Thus, the displayed image region comprises the first image region (i.e., the first crop) and the second image region which is the additional extended view (i.e., the second, extendable, crop). The Field of View (FOV) of the electronic rear-view mirror shown to the driver in the total image region on the display is thereby adjusted. According to this embodiment, the CMS is configured to increase the aperture angle ($\alpha$) of the second image region, and hence the aperture angle ($\alpha$) of the total image region, as the relative angle of the driver's head with respect to the driver's camera of the CMS increases.

According to the second embodiment and preferably, the first of the two crops (the non-extendable one) is not centered on the captured image but is located at its right or left inner side: i) the right side of the image for left-hand-drive vehicles, which are sold in right-hand traffic countries, e.g., Spain; ii), the left side of the image for right-hand-drive vehicles, which are sold in left-hand traffic countries, e.g., UK. Therefore, the driver is provided with a path on the display to expand the second crop outwardly along the horizontal axis of the captured image. More preferably, the length of the path is at least 20% of the length of the selected image region before starting the movement (i.e., displacement). More preferably, the length of the path is at least twice as long as length of the space defined at the other side of the selected region (the "crop").

According to an implementation option of the second embodiment, the second image region (the extendable crop) progressively extends its length at least horizontally outward within the captured image, according to the determined driver's body movement in the driving direction, and wherein the first image region (the "crop") remains unchanged both in size and location. According to another implementation option of the second embodiment, the display device comprises two different portions: a first portion in which the first crop is displayed, and a second portion in which the additional extended view (the second crop) is displayed. According to one example, the display device is one single screen, preferably a touch screen. According to another example, the display device comprises two different screens, where the first portion distinguished by the ECU may be implemented in the first screen, which can be touchless and then cheaper, and the second portion may be implemented in the second screen, which can be touch-sensitive.

According to a third embodiment of the present invention, the ECU of the camera monitoring system is configured to select two image regions (a first crop and a second crop) and to operate the display according to any of two states which depends on the driver's head movement: i) when a head movement is detected, the ECU enters the display in a first state of operation, wherein the second image region is displayed (i.e. switched on) in full on the display or preferably on the second portion of the display device; ii) conversely, when the driver's head is detected to get back to its original position, the ECU enters the display in a second state wherein the second image region is not displayed at all (i.e. switched off).

Additionally, according to a fourth embodiment, the present invention allows the user to customize the system by configuring the sensitivity for (i) moving the displayed image (the "crop" if there is only one image region selected by the ECU, or the first crop if there is a total image region formed by two crops selected by the ECU) within the captured image, or (ii) expanding and/or retracting the additional extended view (the second crop).

According to a fifth embodiment, the electronic display device is in a head-mounted device. The head-mounted device may also be applied to control a driver's pair of glasses with Augmented Reality (AR). The AR glasses display the images captured from the rear-view mirror(s) of the motor vehicle; i.e., the display is at least a portion of the glasses, instead of a screen in the cabin of the vehicle. Preferably, in the case that the display is a portion of the AR glasses, the sensor is in the glasses themselves.

Head/body movements (or a change in head/body position) is detected by a sensor which may be based on different technologies (ultrasound, image, TOF: Time of Flight, radar, etc.). In the case that the display is a screen in the cabin of the vehicle (e.g., located at the driver's door or in the IRMS), the sensor is inside the vehicle. In the case that the display is a portion of the AR glasses, the sensor is in the glasses themselves.

The present invention has a number of advantages with respect to prior art, which can be summarized as follows:

The present invention allows the FOV adjustment of the exterior cameras, which are fixed on the body of the vehicle, without the need of actuators or mechanical movements on these cameras and without touching the display.

The control actions to adjust the FOV are triggered by the driver's gestures, instead of pushing digital buttons (overlays) on top of the displayed image, or instead of touching the display with fingers (which get the screen dirty), and a larger area of action is provided, that is, the driver can make the relevant gesture (with his/her head or fingers) in the air and not in a small/limited-size screen. Furthermore, this feature is especially useful to calibrate the system. That is, when the ECU is associating (i) the first position of the driver's head with the first position of the crop within the "captured image"; and the (ii) second position of the head with the second position of the crop within the "captured image", the system can use the "gesture detection" to detect the head movements and determine its aforementioned positions for calibration.

The present invention allows to improve the view of the exterior lateral side of the motor vehicle to reduce the blind spot zone. That is, the driver may achieve a better view of the blind spot zone by not reducing the aperture angle of the image region shown on the display device, in particular, when the driver is preparing to overtake.

The present invention allows the FOV adjustment only by relevant gestures made by the driver (preferably, driver's head or face movements) to carry out a driving maneuver (e.g., for overtaking or for parking); i.e., the displayed image region does not move constantly by any driver's gesture but only if the driver's gesture detected by the system exceed a threshold.

The present invention allows the FOV adjustment by the detection of driver's relevant gestures and the detection is a comparison (made by the ECU) between a first position ("reference position") and a second position ("current position"). Both positions are based on the location of at least one part of the driver's body, preferably the face/head. The reference position is the detected position of the driver's head at an initial time instant, and the head is not a fixed object (such as the seat, the headrest or the belt of the vehicle) but its position in the vehicle can change from the initial time instant. The ECU determines the movement of the driver's head and the location of his/her head at the current time instant is the "current position", so the "current position" depends only on the driver's head and is compared to the "reference position" that also depends only on the head ("head-to-head" comparison, instead of "head to seat" comparison). That is, the comparison between the positions used the FOV adjustment depends only on the driver's and not on elements external to the driver.

The advantage of using the location of a part of the driver's body instead of another element such as the driver's headrest of the vehicle seat is that: if the reference position is based on the seat, when the seat changes position (for example, a driver typically uses a red traffic light to adjust the position of his seat or headrest), the reference position is lost or should be recalculated through a complex processing and communication with the CAN bus of the vehicle. Also, if the gesture detector is, for example, a radar, the reference position cannot be calculated because the foam of the seats cannot be detected. Furthermore, there are drivers who remove the headrest or can drive with a hat covering the entire headrest, impeding the detection of its (the reference) position.

The present invention allows the user, before start driving, calibrate/customize the sensitivity of the FOV adjustment, in accordance with user's preferences.

These and other advantages will be apparent in the light of the detailed description of the invention.

BRIEF DESCRIPTION OF THE DRAWINGS

For the purpose of aiding the understanding of the characteristics of the invention, according to a preferred practical embodiment thereof and in order to complement this description, the following Figures are attached as an integral part thereof, having an illustrative and non-limiting character.

DETAILED DESCRIPTION

Figure 1:
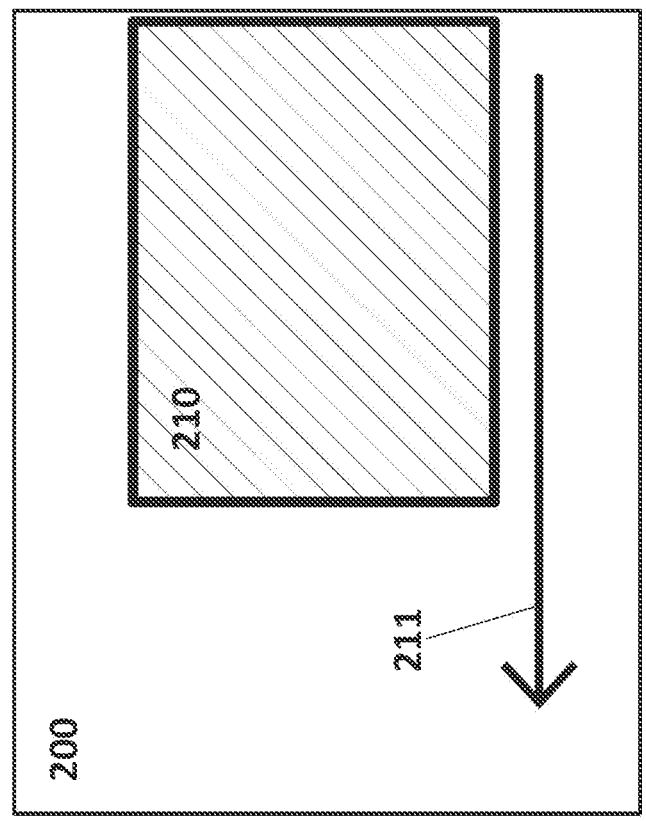
FIG. 1 shows a movement of the driver's head forward and the movement of the displayed image accordingly.
Figure 1:
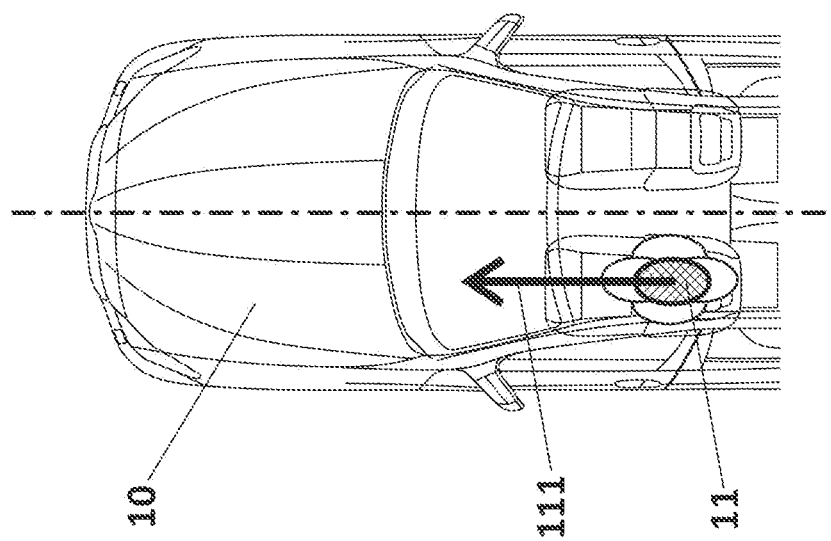

The matters defined in this detailed description are provided to assist in a comprehensive understanding of the invention. Accordingly, those of ordinary skill in the art will recognize that variation changes and modifications of the embodiments described herein can be made without departing from the scope and spirit of the invention. Also, description of well-known functions and elements are omitted for clarity and conciseness.

Of course, the embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

According to a preferred embodiment, the CMS comprises an image processing device comprising a camera pointing substantially rearward and located on a side part (right and/or left) of the motor vehicle (e.g., a car). The obtained captured image comprises at least a lateral/side portion of the car and the zone behind the car. The ECU (Electronic Control Unit) is configured to receive the captured image and carries out an image processing comprising at least selecting a portion of the captured image and send it to a display lubricated inside the cabin of the car. The image capturing device can be fixedly mounted outside the vehicle.

According to a preferred embodiment, the CMS further comprises a gesture detector to allow the driver to command the CMS to adjust the FOV by a movement of the driver's head or other part of the body (e.g., an eye movement or facial gestures). In a possible embodiment of the CMS using the gesture detector, the crop-and-pan functionality may be triggered by a driver's head movement. The driver's head movement may be tracked by a surveillance system, which is preferably within the vehicle, more preferably fixed (i) in front of the driver, or (ii) in the interior rear-view mirror, (iii) or near to the CMS display device. Preferably, the driver surveillance system may comprise a camera. The surveillance system may be capable of working out the position and distance of the driver's head. Thus, the displayed image region within the captured image may be controlled by the driver's head, moving forward when this movement is captured by the gesture detector. There are four possible implementation options for the gesture detector:

(i) In a possible embodiment, gestures can be recognized in images of the user captured by the same camera mounted on the exterior assembly (winglet) used for the CMS to capture the exterior FOV or by an additional camera inside the vehicle (in-cabin camera), for example, near the driver's display or in the interior mirror. The interior camera can work with visible light as well as infrared light. The ECU is then configured to use image processing in order to avoid false positives and false negatives in the detected gestures.

(ii) In another possible embodiment, no extra camera is needed, the gestures are performed on the display without touching it and they are detected by simply increasing the capacity sensibility of its screen.

(iii) A further possible embodiment is based on electrical near-field (E-field) 3D gesture controllers that enable user gesture detection and motion tracking by using a single-chip device with no host processing needed for embedded applications. Thus, only by turning his/her head or waving one hand, the CMS detects that the driver wants an opening (greater) of his/her FOV, and consequently increases the FOV of the external camera. Therefore, this preferred embodiment provides multiple possible locations from which the driver can make the movements.

(iv) A radar sensor system for occupancy detection, where may include an antenna system configured to generate an outgoing radar signal, and a radar sensor configured to receive a sensor signal reflected as a result of the outgoing radar signal. Optionally, it may further comprise an accelerometer so as to obtain an accelerometer data value. It may further comprise an algorithm that generates an improved signal by applying the accelerometer data and offers removal to the sensor signal.

In another preferred embodiment, the display is within a head mounted device (i.e., a near-eye device for a driver), preferably a pair of glasses with Augmented Reality, AR. AR glasses already exist, for example, Google glasses and Microsoft HoloLens. The head mounted device (e.g., an interactive pair of AR glasses) includes i) an optical assembly configured to display virtual content and to enable viewing of at least a portion of a surrounding environment, ii) an integrated processor for processing the virtual content to be displayed, and iii) an integrated image source for introducing the virtual content to the optical assembly. Furthermore, the head mounted device may include a communications facility configured to connect the interactive head-mounted device to an external device such as the ECU of the camera monitoring system (CMS). The head mounted device comprises a gaze position detection unit for detecting the driver's gaze. The proposed CMS using the head mounted device (e.g., with AR glasses as a driver's display, lubricated inside the vehicle when the driver put it on) is capable of generating, based on the position of the driver's head and/or his/her gaze direction, an instruction to move the crop ("digital pan") within the captured image. The captured image may include the symmetric image of the raw captured image. The head movement electronically detected by the head mounted device is consistent with a direction of the driver's eyes/gaze, and so the communications facility is configured to provide the ECU with a video feed consistent with the direction of the head movement and the eye gaze. The video feed sent from the ECU to the head mounted display through the communications facility is an enriched video stream comprising data of at least one of: (i) the displayed image region (crop); and (ii) blind spot detection. The displayed image region (crop) is displayed only when the detected driver's eyes are looking at one specific point on the optical assembly. For example, the display of the AR glasses is off unless the driver is looking to a point where the rearview mirror should be; in this case, the ECU generates a signal to turn on the display of the AR glasses screen only when the "gaze detector" captures that the driver is looking at the particular point.

In a preferred embodiment, the adjustment of the FOV involves the symmetry of the raw captured image, which is the original image captured by the image capturing device, to obtain the symmetric image. The symmetric image can be provided directly by the image capturing device, but it can alternatively be provided by the ECU (more particularly, an ISP) applying image processing. In particular, when the symmetric image is provided directly by the image capturing device, it may be obtained through the hardware of the image sensor which advantageously reduces considerably the amount of operations of image processing (software). The adjustment of the FOV also implies (i) moving the crop within the symmetric image; or (ii) expanding the additional extended view within the symmetric image.

FIG. 1 shows the relationship between the movement (111) of the driver's head (11) detected by a sensor (gesture detector) and the movement (211) or "pan" of the displayed image region (210) or "crop" within the captured image (200), according to a possible example. In this example, the movement (111) of the driver's head (11) along the driving direction is translated into a displacement/movement (211) of the displayed image region (210) processed (by the ECU) in the horizontal direction. Therefore, the change in the Field of View, FOV, seen by the driver (11) is performed indirectly, by changing the location of the crop, which results in a new FOV seen by the driver (11).

In a possible embodiment, the ECU performs image processing to:
  obtain the captured image (200) as the symmetry of the (raw) image captured by the image capturing device, and this symmetry can be obtained through image processing by the ECU (normally, the symmetry is directly performed by the image sensor or imager of the image capturing device);
  obtain the "crop"; i.e., a selection of an image region (210) of the captured image (200), the image region (210) being smaller than the captured image (200); and
  perform a digital "pan", moving the crop within (the symmetry of) the image captured by the image capturing device.

The symmetry of the raw image is performed with respect to its vertical axis. No other type of image processing, such as emulating a conventional rear-view mirror, for example, is required. However, in the case that the arm of the winglet or sharkfin, etc. in the exterior side of the vehicle (10) is short or inexistence may be advantageous to perform operations of image processing for changing the perspective (i.e. perspective correction), for example, by using a homography matrix. It is advantageous to note that applying the homography matrix on: i) the raw image (400); ii) the symmetrical image (200); or iii) the image region (210) is definitely not the same or equivalent to emulate a conventional reflective rear-view mirror. It is not the same or equivalent because the conventional reflective rear-view mirror decreases the aperture angle ($\alpha$) of the reflected image as increases the relative angle between the driver's head and the display device which causes an undesired reduction of the view of the blind spot zone.

Preferably, when the used image capturing device are located at an exterior side of the vehicle (10), the captured image (200) has a FOV in a range of 40°-60°, while the image region (210) has a FOV between 60% and 80% the length of the captured image (200). The ratio shape/geometry of the captured image (200) keeps the same for the crop or image region (210). If an 80% FOV is in use when cropped, FOV of the crop is 32° (calculated as 80% of 40°); whereas if a 60% FOV is in use when cropped, FOV of the crop is 36° (calculated as 60% of 60°). When the used image capturing device are associated with an interior IRMS, the FOV of the captured image of is 70°, according to another non-limiting example.

Figure 2:
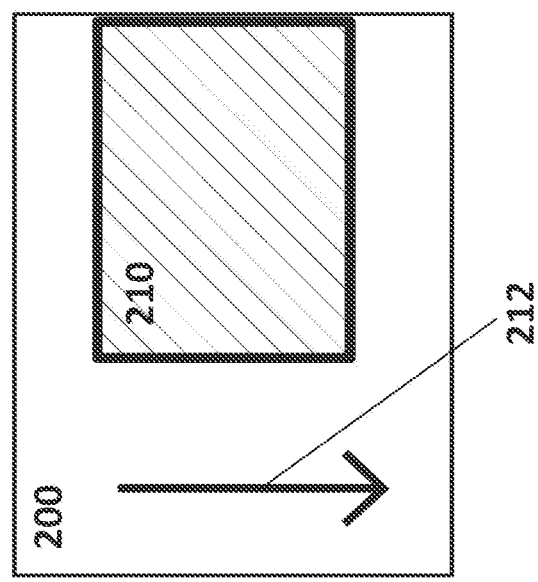
FIG. 2 shows a movement of the driver's head upwards and the movement of the displayed image accordingly.
Figure 2:
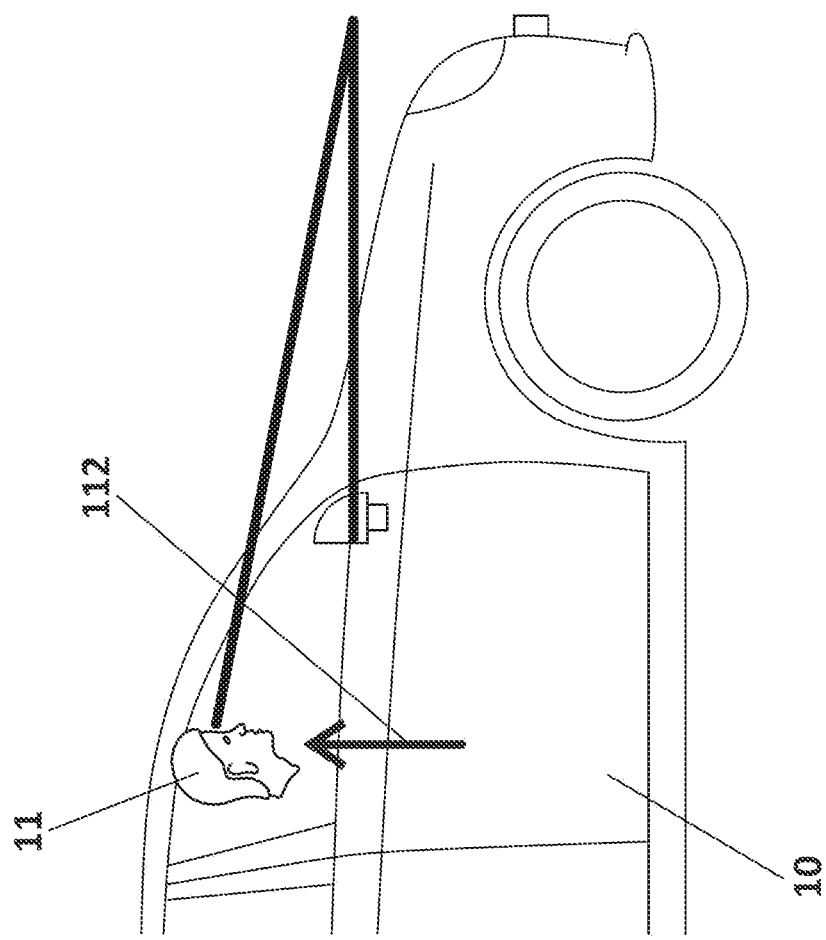

FIG. 2 shows the relationship between another movement (112) of the driver's head (11) and the movement (212) of the displayed image region (210), according to another possible example. In this example, the movement (212) of the displayed image region (210) is in the vertical direction and downwards when the movement (112) of the driver's head (11) is upwards.

The crop or displayed image region (210) is displaced according to a pre-established relationship. The pre-established relationship may be linear or non-linear (see FIG. 3).

Figure 3:
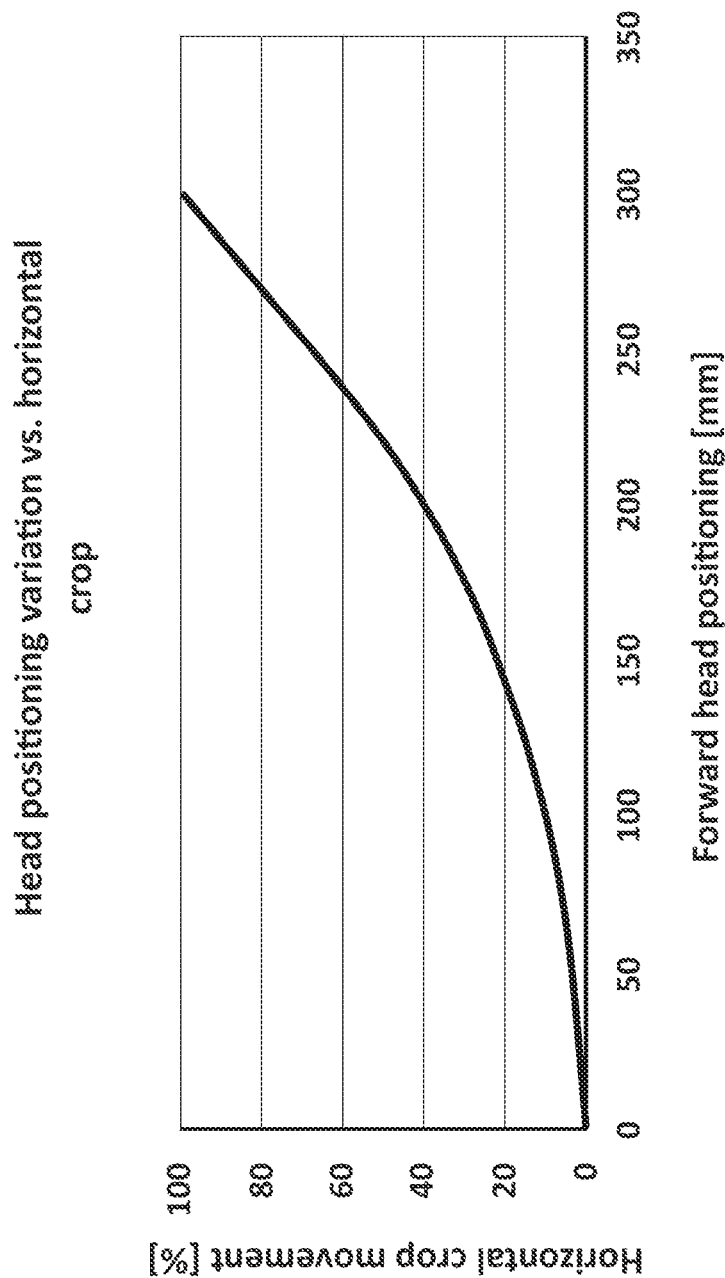
FIG. 3 shows a graphical representation of the relationship between the movement of the displayed image and the movement of the driver's head.

Table 1 below and FIG. 3 illustrate horizontal movements of the crop based on the movement of the driver's head forward along the driving direction and on the length of the crop.

TABLE 1

| Forward head positioning variation (mm) | Horizontal crop movement (%) |
| --- | --- |
| 0 | 0 |
| 100 | 10 |

TABLE 1-continued

| Forward head positioning variation (mm) | Horizontal crop movement (%) |
|---|---|
| 200 | 40 |
| 300 | 100 |

If the horizontal crop movement depending on crop length, as in the examples of Table 1 above, is 100% when the head moves forward 300 mm, if the camera captures 60°, and the crop is 60% of the camera, the crop has an FOV of 36°, i.e. it has 24° left for horizontal translation.

Figure 4:
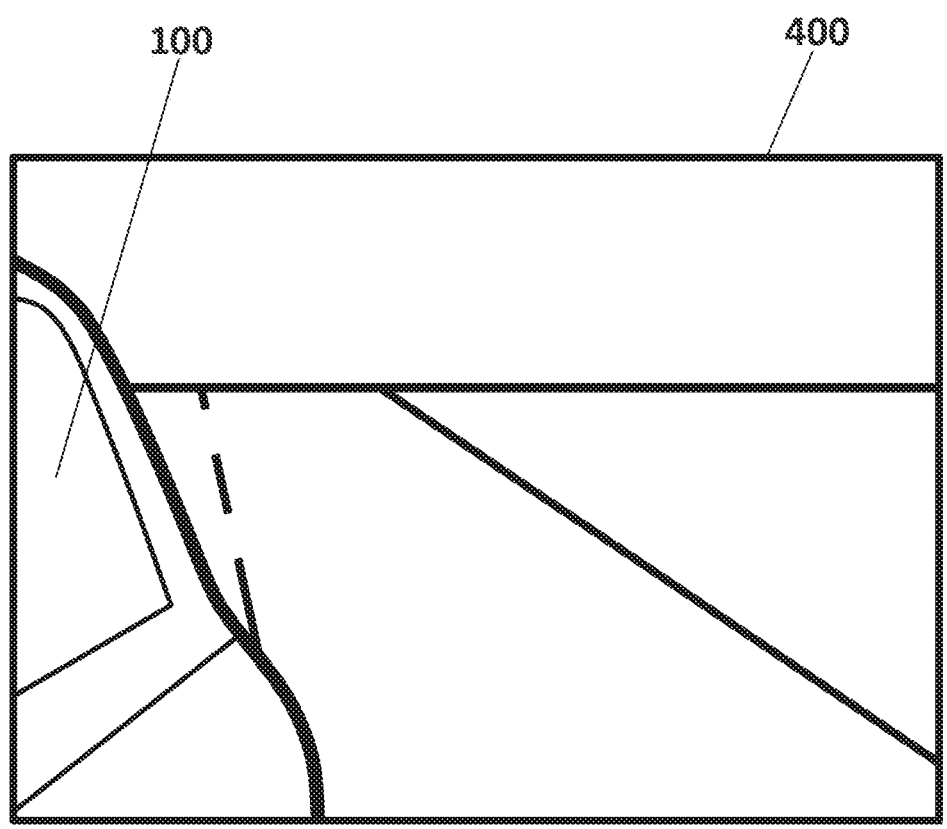
FIG. 4 shows the raw image captured by a camera located at the driver's side.

FIG. 4 shows the raw image (400) captured by the image capturing device located on a winglet in the exterior side of the vehicle (10) corresponding to the driver's side; in this case, the raw image (400) captured by the image capturing device (e.g., an exterior camera) located on the left side of the vehicle (10). This raw image (400) including a partial image of the vehicle (10) on the left is what is seen by the image capturing device located on the side of the driver (11). The exterior square corresponds to the image border of the total FOV captured by the image capturing device, for example, a FOV of 60 degrees.

Figure 5:
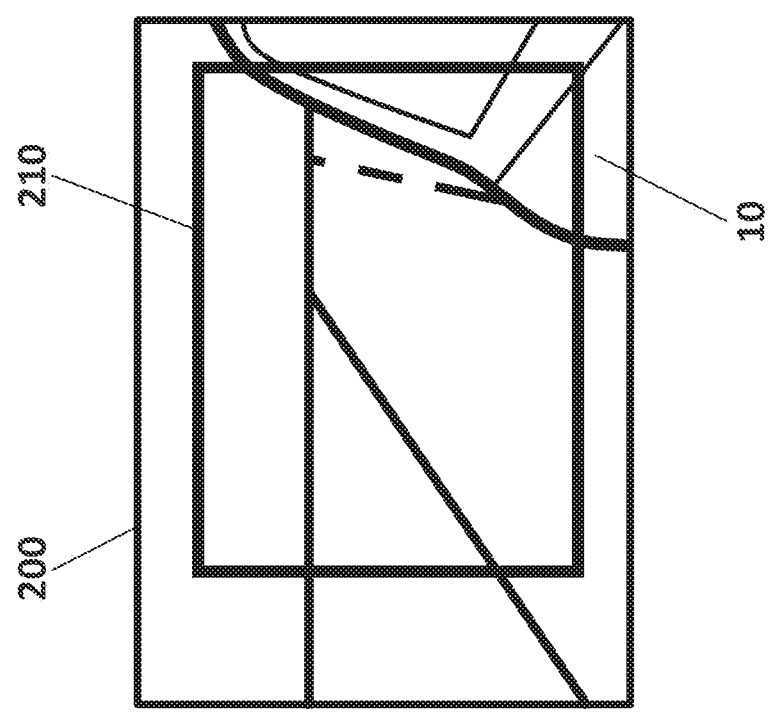
FIG. 5 shows two pictures of the captured image provided by the camera located at the driver's side and the displayed image moving within the captured image, in the left picture the image region of the captured image which is displayed is for a first position of the driver's head and in the right picture when the driver's head moves a few millimeters forward in the driving direction.
Figure 5:
Figure 5:
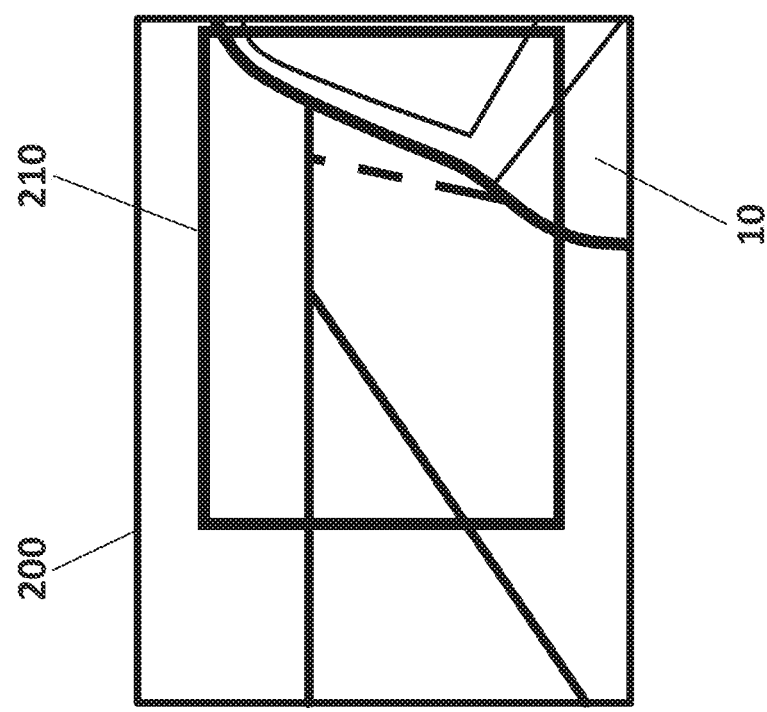
Figure 6:
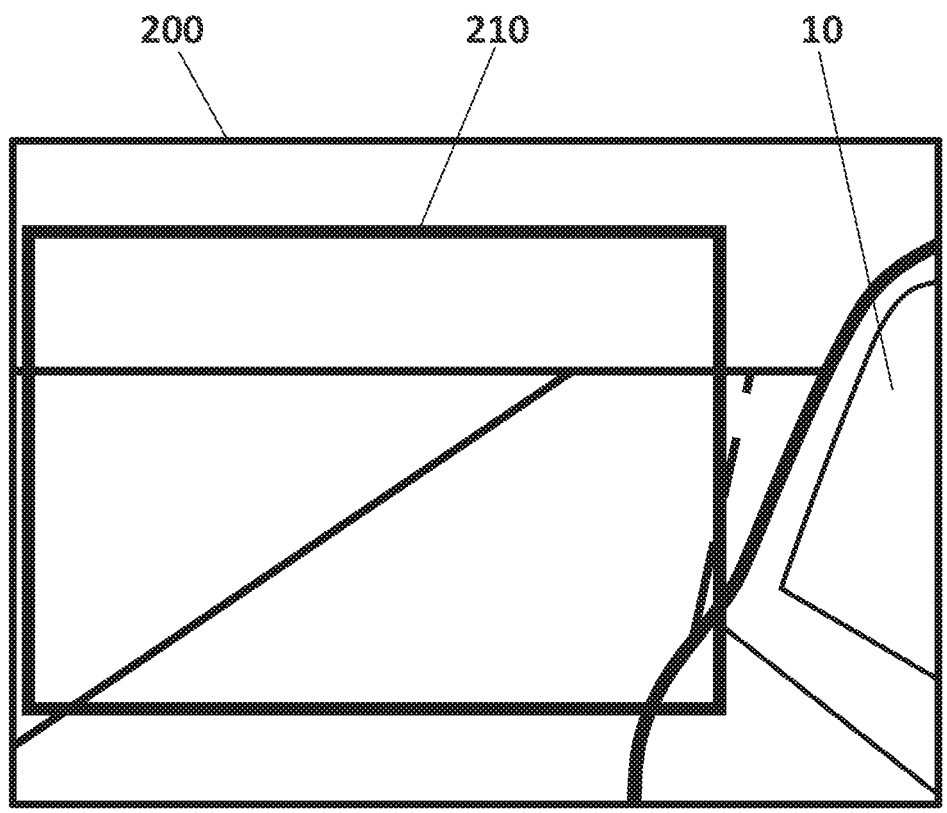
FIG. 6 shows the displayed image region of the captured image horizontally moved up to its whole length when the driver's head moves further forward in the driving direction.

From the raw image (400) shown in FIG. 4, the captured image (200) shown in FIG. 5 is obtained as the symmetry of the raw image (400) with respect to its vertical axis. Hence, the partial image of the vehicle (10) is seen on the right side of the captured image (200). According to this example, only the symmetry is the image processing required to obtain the captured image (200), but there is no emulation of a conventional rear-view mirror or other image processing. The interior square corresponds to the crop or image region (210) selected to be displayed; i.e., the border of the effective FOV shown to the driver (11) on his/her display, for example an effective FOV of 36 degrees. In FIGS. 5 and 6, the effective FOV shows the highway with the horizon included.

FIG. 5 shows the crop or image region (210) displayed when the ECU has moved the crop horizontally 40% (of the total crop movement) within the captured image (200). According to Table 1 and FIG. 3, this corresponds to the case when the driver has moved his/her head 200 millimetres forward, i.e. in the driving direction of the vehicle (10).

Figure 11:
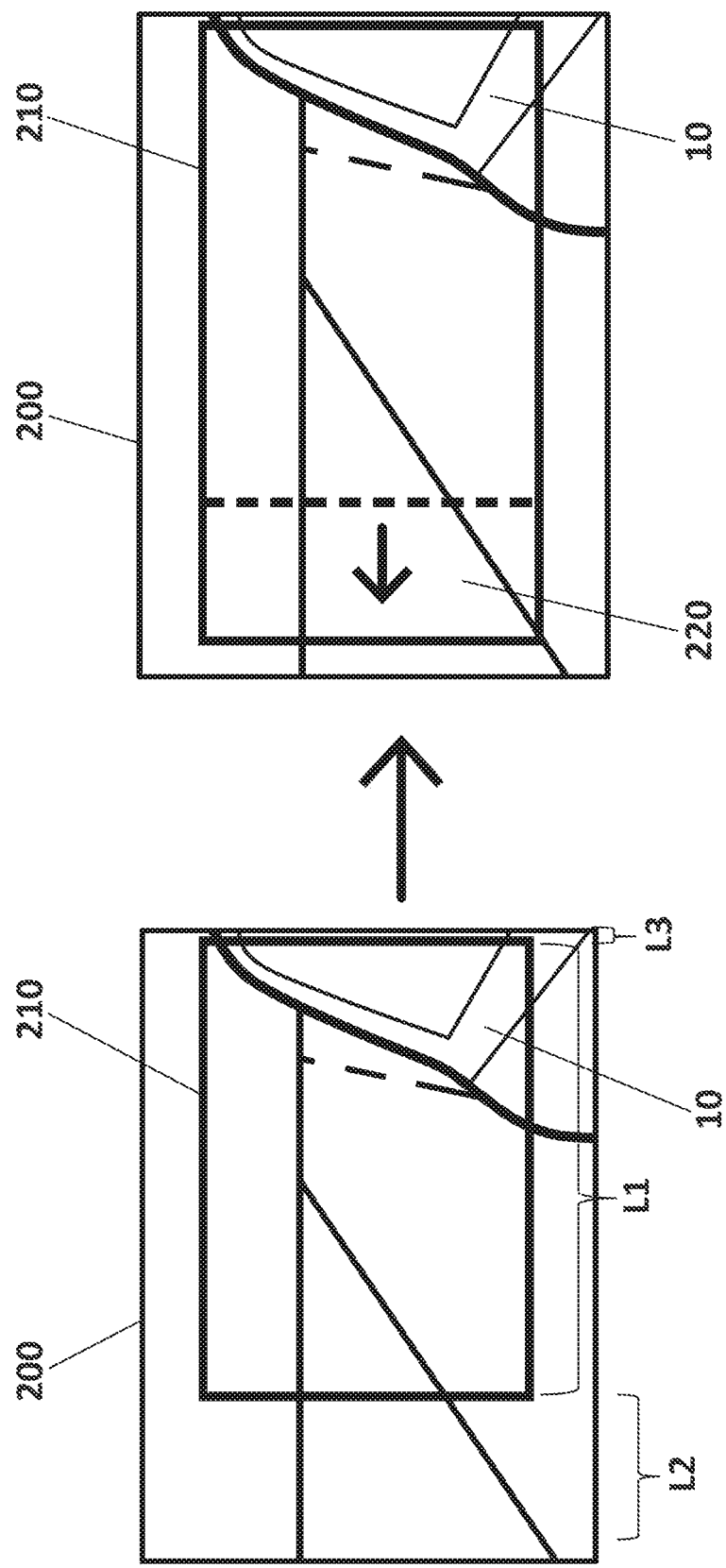
FIG. 11 shows two pictures of the captured image provided by the camera located at the left side of the vehicle and the displayed image which horizontally expands outwardly within the captured image as the driver's head moves a few millimeters forward in the driving direction.

FIG. 6 shows the crop or image region (210) displayed when the ECU has moved the crop horizontally 100%, which would reach the limit of the captured image. According to Table 1 and FIG. 3, this corresponds to the case when the driver has moved his/her head forward 300 millimetres, i.e. in the driving direction of the vehicle (10). For example, in the case that the image capturing device are located at a mounting assembly of the left exterior rear-view mirror, the crop or image region (210) is preferably at the right side of the captured image when the driver's head is in the usual driving position, while the image region (210) moves to the left, as shown in FIG. 6, when the head moves forward. That is, the image region (210) is initially not centered, i.e., the image region (210) is off-center on the captured image, but is usually located at an inner, right or left, side: e.g., the right side for left-hand-drive vehicles in right-hand traffic countries. Therefore, the driver is provided with a path on the display to move the crop along the horizontal axis of the captured image which is much longer. For example, going to FIG. 11, in particular to the left picture, the displayed image region or crop (210, 210') is not centered so as to leave a space (i.e., path) on its left within the captured image (200) that is not displayed. The length (L2) of the space is at least 20% of the length (L1) of the image region (210, 210') before starting to be moved within the capture image (200). Furthermore, the crop (210, 210') may leave a smaller space on its right with a length (L3), being L2≥L3 as illustrated in FIG. 11. The skilled person recognizes that the size of the raw image (400) captured by the image capturing device (i.e., camera) may be a limitation. The aperture angle (α) of the image region (210) may depend on the lens and the image sensor (i.e., imager) of the camera. A wider aperture angle (α) of the image region (210) may be achieved by a lens including a curved surface or increasing the size of the image sensor. A lens including a curved surface may cause distorted images. It may be needed image processing to correct distorted images. Thus, it is particularly advantageous the crop (image region) is not centered on the captured image (200) so as to maximize the above-mentioned available path.

The same crop movement can be performed for the driver as well as the co-driver occupying the front passenger seat of the vehicle, for which another camera of the CMS is provided. In the case of the conventional rear-view mirrors, rear-view mirrors with different positions and/or sizes are used. However, in the case of CMS, the same values for adjusting the FOV can be used maintaining the FOV symmetry for both sides of the vehicle.

The relationship between the movements of the crop and the driver's head may be linear, but there may be other alternatives, for example, for different driving scenarios such as: i) a dead zone where the CMS FOV remains fixed or with very small variations because the driver is driving right and alone in a highway, and ii) another zone where the crop displacement is required to be more significant because the driver is merging onto a highway or changing lanes.

Therefore, the linear movement of the crop may be vertical, horizontal, and ultimately the crop may be moved diagonally. Also, the crop may optionally be zoom in/out. Zoom out is increasing the size of the crop (displayed image), whereas zoom in is decreasing the size of the crop (displayed image). Furthermore, if the gesture detector is a camera, it is possible to detect the driver's gaze, i.e. at which point the driver is looking. Therefore, according to a further possible example, the ECU can carry out the digital pan when there is a head movement and also if the driver is looking at the display. Thus, according to this example, if there is a head movement but the driver is not looking at the display, then the crop is not moved. So, the displayed image is not always moving each time the driver moves his/her head, only when the detected gesture complies with a threshold or certain criteria.

To summarise the preceding paragraph, the driver's head could be detected on three axes, x, y and z, with the driving axis, denoted as x, being essential and the other two axes being optional/additional. The ECU can work both with the locations of the head and with a relative angle of the head with respect to the driver's display (alpha angle, if seen from the top view). If the driver moves his/her head forward, he/she is increasing the alpha angle and is displacing the crop to the left in the display, in a straight direction according to the horizontal axis, x.

The ECU can work and move the crop based on at least the variation of the position (defined by x, y, z coordinates) of the head or on at least the alpha (top view) angle, beta (lateral view) angle, gamma angle of the head. The ECU can perform the digital pan (move the crop) based on the following data obtained by the gesture detector (measured by a sensor or extracted from an image of the head captured by a camera):

Movement (change in position) of the head along the driving direction (longitudinal axis of the vehicle).

Relative alpha/beta angle of the head only taking into account the driving direction. The variation of these angles depends exclusively on the variation of the head position, since the driver's display device is fixed. The alpha angle is the relative angle seen from the top view between the head and the camera.

Movement (change in position) of the head along the driving direction and the transverse axis going from side to side: from the exterior rear-view (driver's) mirror to the other (co-driver's) rear-view mirror.

Relative alpha/beta angle of the head taking into account the driving direction and its transverse axis going from side to side.

Movement (change in position) along the driving direction, the transverse axis going from side to side (from one exterior rear-view mirror to the other exterior rear-view mirror), and the height of the head with respect to the ground (either the floor of the vehicle or the road surface).

Relative angle of the head with respect to the display seen from the side of the vehicle, i.e. this is the angle established by the height of the head with respect to the ground.

Figure 7:
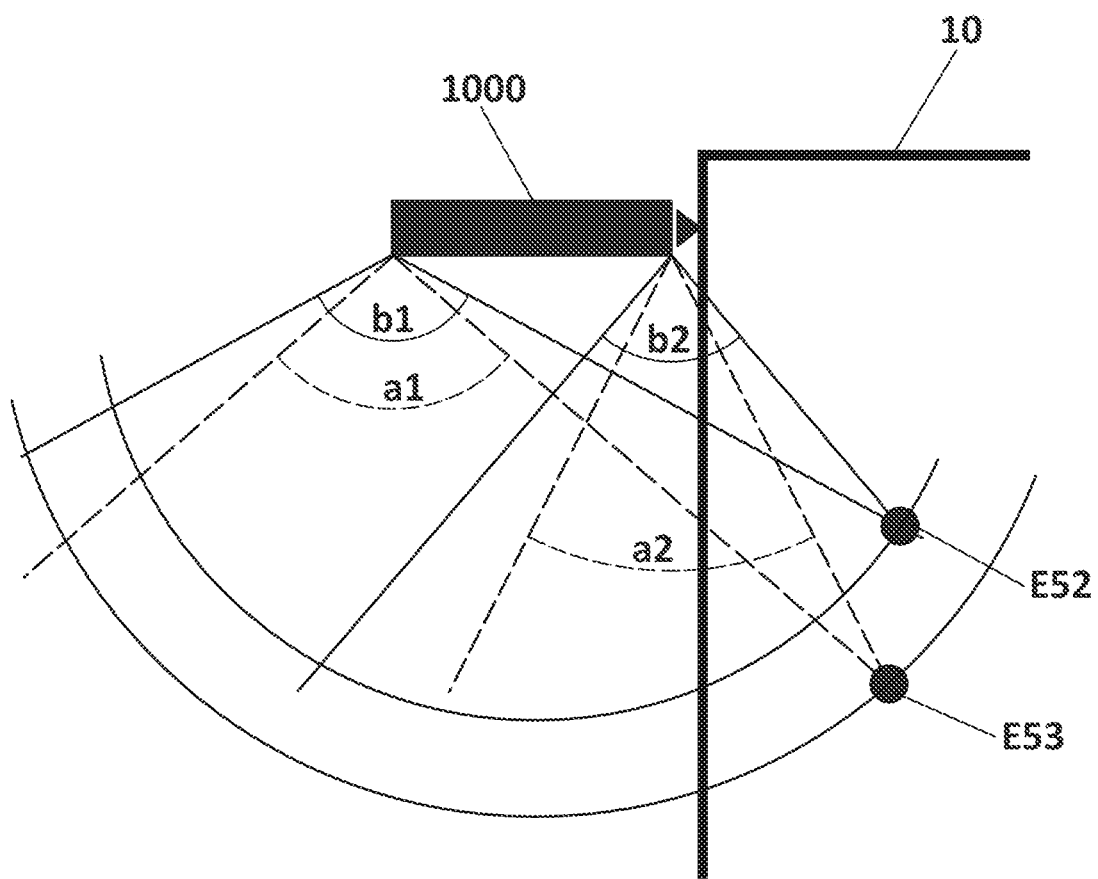
FIG. 7 shows a comparison between the optical lines reflected in a conventional reflective rear-view mirror and the field of view captured by a camera arranged on the exterior side of a motor vehicle, when the driver's head moves from a first position of the driver's eyes to a second position of the driver's eyes.

When the driver is in front of the rear-view mirror (without any relative angle), the image reflected by the rear-view mirror and the image shown on the display coincide, i.e. both images are exactly the same. However, these images are neither the same and nor equivalent if there is a relative angle between the driver's head and the rear-view mirror (1000) or there is a head movement, as shown in FIG. 7. As the head moves forward, the driver's eyes go from a first position (E51) to a second position (E52): the angle of the driver's view (a1, a2) with respect to the reflective rear-view mirror (1000) corresponding to the driver's eye first position (E51) is different from the angle of the driver's view (b1, b2) corresponding to the second position (E52). The case where there is a greater difference between both images is when the head is moved forward at the same level as the mirror (1000). The captured image is simply the symmetrical image of the—raw—image covering the exterior FOV, i.e., captured by the camera associated with the rear-view mirror, but a conventional rear-view mirror is not emulated by the captured image. Therefore, computationally speaking, it is advantageously less tedious. That is, the reflected image from reflective mirror is neither the same as nor technically equivalent to the displayed image obtained by image processing (symmetry) plus cropping+panning performed by the proposed CMS.

FIG. 7 shows the comparison between the optical lines reflected in a conventional reflective rear-view mirror (1000) and the field of view captured by a camera arranged on the exterior side of a motor vehicle. As the driver's head moves forward from the first position (E51) to the second position (E52), the reflected optical lines (i.e., what the driver sees through the mirror) become increasingly parallel. Therefore, the second angle (b1, b2) corresponding to the second position (E52)) is greater than the first angle (a1, a2) corresponding to the first position (E51). Note that if the angle increases, this entails that the lines tend to be parallel, and when the optical lines are parallel, the image is being distorted. When the driver's head is very far ahead (almost at the same level as the mirror), the displayed image (i.e., image region (210)) of the present invention is very different from what the driver can see in the conventional rear-view mirror (1000). When the driver's moves his/her head forward approaching it towards the mirror (1000), i.e., moving the head to the left in FIG. 7, the conventional reflective mirror (1000) is actually zooming in due to the fact that the head is located in a closer position to the conventional reflective mirror (1000). In addition, the conventional reflective mirror 1000 is changing the field of view shown/reflected when the driver's moves his/her head, while the field of view captured by the exterior side camera which is displayed by the display device is always a constant FOV, according to this particular embodiment in which the image region (210) is formed by a single crop.

Figure 8:
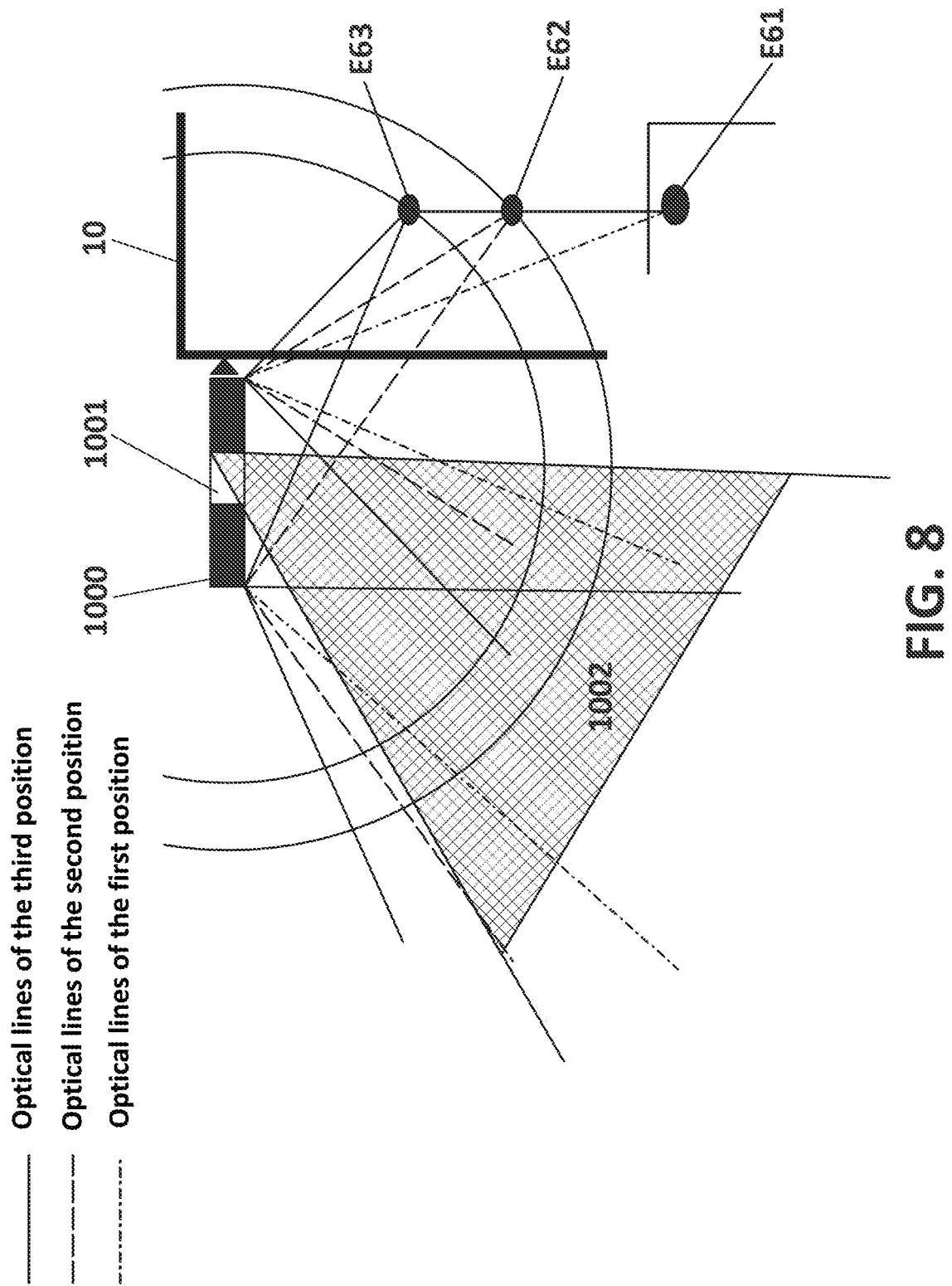
FIG. 8 shows a comparison between the optical lines reflected in the conventional reflective rear-view mirror and the field of view captured by the exterior side camera, when the driver's head moves from the second position of the driver's eyes to a third position of the driver's eyes.

Another further-third-position of the driver's eyes is added in FIG. 8, so that the variation of the optical lines as the driver moves his/her head can be shown. The depicted square (1001) in the mirror (1000) represents the lens of the camera of the CMS, and the depicted triangle (1002) represents the FOV of the CMS camera associated with the rear-view mirror (1000), i.e., equivalent to the captured image. FIG. 8 shows the comparison between the image captured by the exterior side camera, associated with the rear-view mirror (1000), and the optical lines of a conventional reflective rearview mirror. In this example of FIG. 8, it can clearly be observed that the respective optical lines corresponding to first position (E61), second position (E62) and third position (E63) become gradually more inclined, so when the driver's eye moves closer to the mirror (1000), the relative angle makes the images observed by the reflective mirror (1000) be not consistent with the true magnitude (and therefore the difference between the CMS image—merely a symmetry—and the reflected image becomes increasingly more accentuated). It is advantageous to note that both images (the reflective image and the displayed image) are not the same, and the difference is accentuated more as the driver's head position goes more forward (i.e., as the relative angle between camera/mirror and the driver's head varies).

Figure 9:
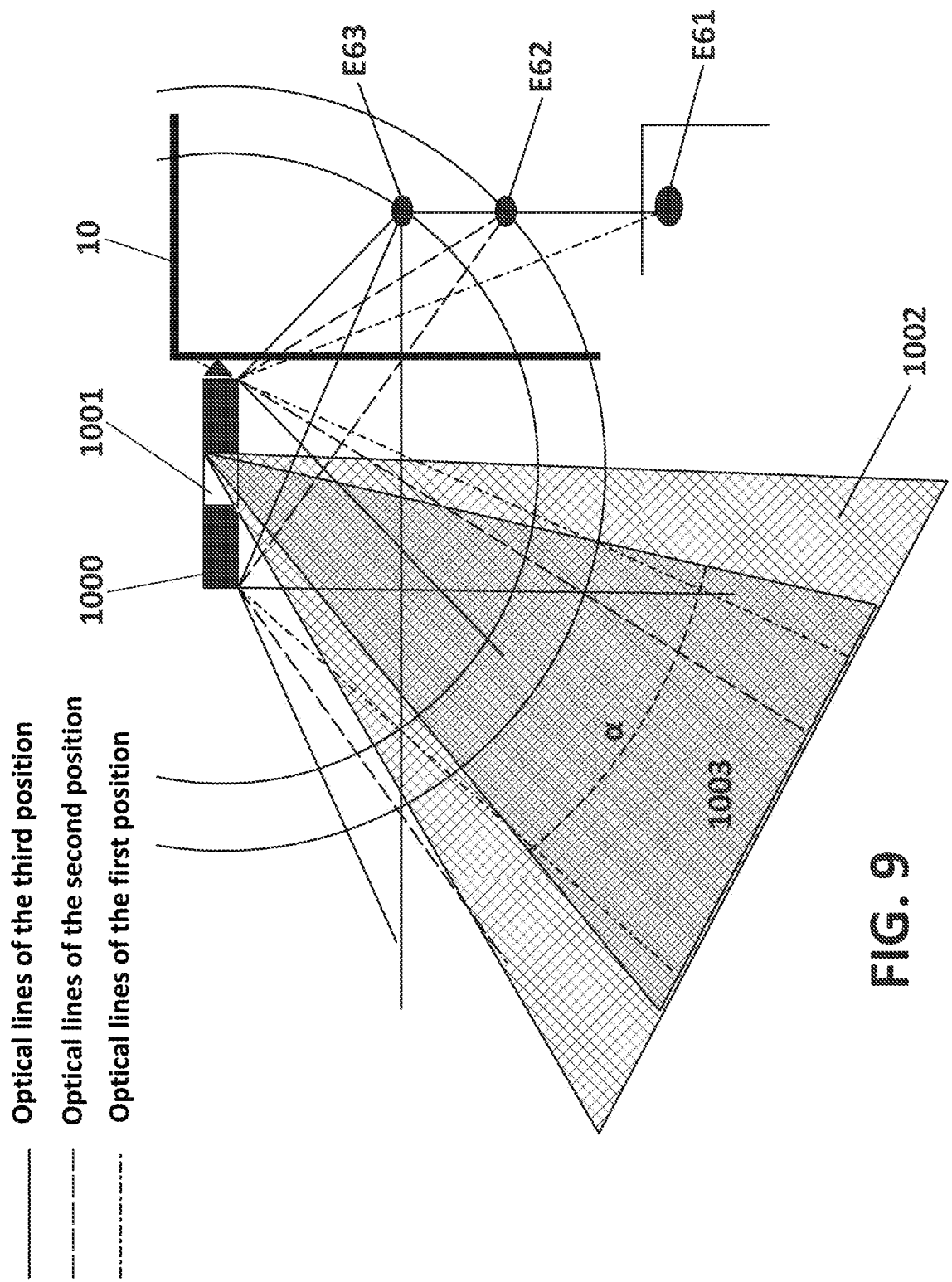
FIG. 9 shows a comparison between the optical lines reflected in the conventional reflective rear-view mirror and the field of view captured by the exterior side camera, and the FOV of the image region to be displayed.

FIG. 9 shows a triangle (1003) which represents the crop within the captured image, the captured image represented by the other triangle being either the raw image or its symmetrical image. FIG. 9 shows the difference between the image perceived by the driver using the reflective image of the conventional mirror and the image displayed by the driver's display device. The aperture angle ($\alpha$) of the displayed FOV does not change when the position of the driver's head change. More particularly, the value of aperture angle ($\alpha$) remains fixed when the relative angle between CMS and driver's head changes. On the contrary, the displayed FOV or crop (i.e., the image region (210)) does change when the position of the driver's head changes (its relative angle alpha changes), as the image region (210) is moved within the captured image. As the driver's head moves forward, the aperture angle ($\alpha$) of the image region (210) keeps fixed because the angle ($\alpha$) is independent of the detected head/body position, but the image region (210) represented in FIG. 9 by the triangle (1003), is moved at least horizontally within the captured image. The captured image is a mere symmetry of the raw image captured by the image capturing device of the CMS. If there were a wall behind the vehicle (10), the camera could not capture any image behind the wall and so the triangle (1003) would get truncated. The, aperture, angle ($\alpha$) of the triangle (1003) is the same for the first position (E61) as for the second position (E62) and the third position (E63).

That is, the image region (210) to be displayed comprises a fixed aperture angle ($\alpha$) of FOV.

Figure 10:
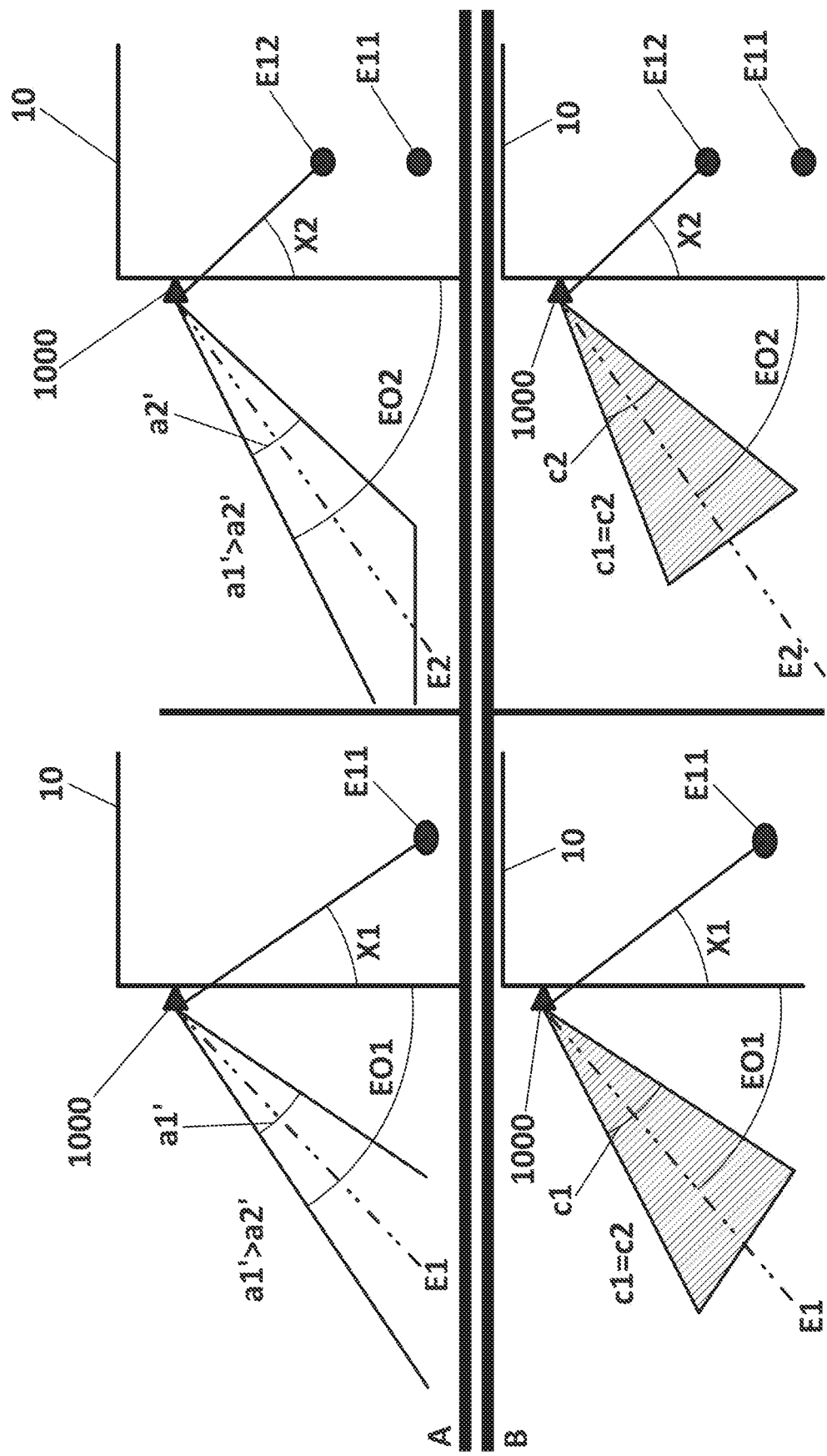
FIG. 10 shows a comparison between relative angles of the driver's eyes with respect to the conventional reflective rear-view mirror and with respect to the exterior side camera, when the driver's head moves from a first position of the driver's eyes to a second position of the driver's eyes.

FIG. 10 shows a comparison between the aperture angle (a1', a2') of the conventional reflective rear-view mirror (1000)—upper quadrants A of FIG. 10—and the aperture angle (C1, C2) of a preferred embodiment of the invention—bottom quadrants B of FIG. 10. Also, FIG. 10 illustrates the relative angle (X1, X2) between the obtained position of the part of the driver's body (e.g., the driver's head) and:
(i) the image capturing device (e.g., camera, if the image capturing device are located on the left side or right side (e.g., camera associated with an exterior rear-view mirror) of the vehicle (10);
(ii) the electronic display device, if the image capturing device (e.g., camera associated with an interior rear-view mirror)) are located on the roof of the vehicle (10).

As shown in FIG. 10, a first position (E11) of the driver's eyes and their second position (E12) when the head moves forward. The angle of the driver's view (a1') with respect to the reflective rear-view mirror (1000) corresponding to this first position (E11), represented at the left side of FIG. 10, is greater than the angle of the driver's view (a2') corresponding to the second position (E12), represented at the left side of FIG. 10; i.e., a1'>a2', as explained before in FIG. 7. FIG. 10 also shows the optical axis (E1, E2) as the bisector of the triangle that represents the FOV for the first position (E11) and the second position (E12) respectively; the FOV being directly shown to the driver in the reflective rear-view mirror (1000) in the case of a conventional system represented in the upper part (A) of FIG. 10, the FOV being displayed, as a crop, according to a preferred embodiment of the invention represented in the lower part (B) of FIG. 10. When the driver's eyes go to the first position (E11) to the second position (E12), in the example of FIG. 10:
the relative angle (X1, X2) between the driver's eyes and the left side exterior rear-view mirror (1000) increases, i.e., X2>X1;
the angle (EO1, EO2) of the optical axis (E1, E2) increases, i.e., EO2>EO1;
the angle of the driver's view (a1', a2') with respect to the exterior rear-view mirror (1000), this angle (a1', a2') defining the aperture of the FOV shown in the rear-view mirror (1000) of the conventional system, decreases, i.e., a1'>a2';
the aperture angle (C1, C2) of the crop or FOV displayed for the first position (E11) and the second position (E12) remains constant, i.e., C1=C2.

Therefore, the aperture of the crop remains constant, C1=C2, with respect to the variation of the angle X1 to X2 due to the change in position of the driver's eyes from E11 to E12. Note that the relative angle between the driver's eyes and the conventional side exterior rear-view mirror (1000) is not the relative angle between the driver's eyes and the camera located on the exterior side and associated with the exterior rear-view mirror. For example, in cars (usually not in trucks) the reflective mirror is replaced by an exterior camera which does not have to be located exactly where it is in the mirror (for example, it could be a little lower and not visible to the driver). In the case of trucks, it is very likely that the rearview mirror is not replaced by an exterior camera, both the mirror and the camera co-exist and work in complementary way.

Furthermore, there is another variable factor: the distance between the driver's eyes and the rear-view mirror. In the second position (E12), the driver's head is closer to the rear-view mirror, so there is a "zoom in", the "zoom in" reducing the aperture angle (C1, C2) of the single crop. Therefore, the angle (C1, C2) of the displayed FOV is constant for the variation of the angle X1, X2, but changes when "zooming in/out".

Furthermore, an interior camera of the vehicle capturing images of the driver and functioning as a gesture detector can sense, not only the position/movement of his/her head but also detect the eyes. Then, the ECU can optionally establish a midpoint between the two eyes from the images provided by the interior camera (the gesture detector): the detection of the head can be established as the midpoint between the eyes. Another option is to calculate the outline of the head. The camera can capture different parts of the face (ears, mouth/lips, nose, etc.).

FIG. 11 shows another, second, embodiment where the displayed image region (210) comprises two image regions or crops selected by the ECU: a first crop (210') and a second crop which corresponds to an additional extended view (220). The first crop (210') is selected by the electronic control unit, ECU, from the captured image (200) and encompasses a portion of the exterior part of the vehicle (10). The additional extended view (220) is a second crop selected by the ECU from the captured image (200), where the additional extended view (220) is located near the first crop (210'). As shown in FIG. 11, it may be particularly located next to the first crop (210'), i.e., adjacent to the first crop (210'), and may preferably have the same height as the first crop (210'). The gesture detector is configured to obtain at least one position of at least one part of the driver's body (e.g., the driver's head), and the ECU is configured to adjust the displayed image region (210) of the exterior FOV based on the at least one obtained position, by expanding in length the additional extended view (220) when the detected relative angle (X1, X2) between the driver's head and the camera monitoring system—i) camera for ERMS or ii) display for IRMS—is increased. This is, when the gesture detector detects that the relative angle (X1, X2) increases (i.e., when the driver moves his/her head forward before overtaking), then the ECU is configured to lengthen (i.e., to expand) horizontally outwardly the additional extended view (220). Further, when the gesture detector detects that the relative angle (X1, X2) decreases, then the ECU is configured to shorten (i.e., contract) horizontally inwardly the additional extended view (220) back to the original situation. It is preferred that the ECU is configured to expand or retract progressively as the relative angle (X1, X2) increases or decreases respectively. It is advantageous to note that the shown example increases the aperture angle (α) of the image region (210) as increases the relative angle of the driver's head with respect to the CMS. Therefore, the additional extended view (220) causes an improved field of view of the exterior lateral adjacent area of the driver's vehicle because it reduces the blind spot zone when overtaking. It is advantageous to note that, according to this example, the driver will always see at least a portion of the exterior side of the vehicle at all times even when the head moves forward. This is, the first crop (210') remains fixed (i.e., unchanged) regardless of the driver's head movement.

Therefore, comparing the first embodiment of the invention, wherein there is only one single crop selected by the ECU, and the second embodiment of the invention, wherein there are two crops selected by the ECU:
In the first embodiment, the aperture angle (α) of the displayed image region (210) is fixed in respect of any change of the relative angle between the driver's head and the display device;
In the second embodiment the aperture angle (α) of the displayed image region (210), formed by the first crop (210') and the additional extended view (220) or second crop, is increased as the relative angle between the driver's head and the display device is increased.

Preferably, the length of the additional extended view (220) is increased, at least, when the driver moves his/her head forward. The additional extended view (220) progressively increases/decreases its horizontal length as a result of an increase/decrease of the relative angle between the driver's head and the display device; while the first crop (210') remains unchanged regardless of the driver's head movement to ensure an exterior lateral portion of the vehicle is permanently displayed. The first crop (210') once displayed is smaller than the display device. Thus, the display device is large enough to display both crops: (210') and the additional extended view (220).

According to another example, the additional extended view (220) may be switched off if head movements are not detected (i.e., during the normal driving condition, the driver is not overtaking). As the driver's head moves forward, the relative angle between the driver's head and the display device is increased, so when the ECU detects that it passes a threshold, the ECU is configured to generate the extended view (220) without modifying the first crop (210'). According to a possible embodiment, the first crop (210') is not displayed on the entire screen size. Due to the fact that the first crop (210') is smaller than the actual size of the display device, there is space available to show, as depicted in FIG. 11, and subsequently to expand the additional extended view (220). According to this example, the first crop (210') is always displayed while driving, and is fixed (i.e., constant over time) both in location within the capture image (200) and in size and shape. On the other hand, the additional extended view (220) may not be fixed since it may increase its length. This is, the aperture angle ($\alpha$) of the whole, displayed, image region (210) is increased based on the detected increase in the relative angle (X1, X2).

FIG. 11 also shows the relationship between the movement of the driver's head detected by a sensor (gesture detector) and the expansion of the displayed additional extended view (220) within the captured image 200, according to a possible example. In this example, the movement of the driver's head along the driving direction is translated into a growth of the displayed additional extended view (220) processed (by the ECU) in the horizontal direction. Therefore, the change (i.e., adjustment) in the Field of View, FOV, seen by the driver is performed indirectly, by lengthening of the second crop (220), which results in a new FOV seen by the driver.

The ECU performs image processing to:
obtain the captured image (200) as the symmetry of the (raw) image captured by the image capturing device, and this symmetry can be obtained through image processing by the ECU (normally, the symmetry is directly performed by the image sensor or imager of the image capturing device);
obtain the first crop (210) being smaller than the captured image 200 and encompassing at least a portion of an exterior side of the vehicle 10; and
perform a digital expansion of the displayed additional extended view (220), increasing its length.

The digital expansion of the displayed additional extended view 220 may be according to a pre-established relationship. The pre-established relationship may be linear or non-linear (see FIG. 3).

For example, the first crop (210') is displayed permanently while the vehicle is running. On the other hand, the ECU is configured to generate the instruction to at least horizontally enlarged the additional extended view (220) by 40% of the total length of the first crop (210'). This corresponds to the case when the driver has moved his/her head 200 millimetres forward, i.e., in the driving direction of the vehicle (10).

According to this shown embodiment, the ECU is configured to horizontally expand the additional extended view (220) displayed to reach the limit of the captured image (200). Preferably, the first crop (210') is at the right side of the captured image when the driver's head is in the usual driving position, while the additional extended view (220) expands to the left, as shown in FIG. 11, when the head moves forward. That is, the first crop (210') is initially not centered on the captured image but is usually located at the right side. Therefore, the driver is provided with a path on the display to increase the length of the additional extended view (220) along the horizontal axis of the captured image which is much longer. In particular, the first crop (210') is not centered so as to leave an available space on its left within the captured image (200) that is not displayed. The length (L2) of the space is at least 20% of the length (L1) of the first crop 210'. Furthermore, the length (L2) is at least twice as long as the smallest length (L3) left from the right border of the captured image (200).

The linear movement of the additional extended view may be vertical, horizontal, and ultimately the second crop may be moved diagonally (not shown). Optionally, the sensor may be configured to detect the, at least one part, of the driver's body in the three-dimensional space, and wherein the ECU may configured to select an additional extended view (220) located up to the first image region (210'), wherein the additional extended view (220) progressively extends its height vertically downwards within the captured image (200) according to the determined body movement in a vertical direction, and wherein the first image region (210') remains fixed (i.e., unchanged) (not shown).

Also, the first and the second crops (210', 220) forming the displayed image region (210) may optionally be zoom in/out. Zoom out is increasing the size of any of the two crops (210' 220), whereas zoom in is decreasing the size of any of the crops (210', 220). Furthermore, if the gesture detector is a camera, it is possible to detect the driver's gaze, i.e. at which point the driver is looking. Therefore, according to a further possible example, the ECU can carry out the digital expansion of the additional extended view (220) when a head movement is detected and also if the driver is looking at the display device. Thus, according to this example, if there is a head movement but the driver is not looking at the display, then the additional extended view (220) is not displayed. So, the additional extended view (220) is not always displayed each time the driver moves his/her head, only when the detected gesture complies with a threshold or certain criteria.

To summarise the above-mentioned, the driver's head could be detected on three axes, x, y and z, with the driving axis, denoted as x, being essential and the other two axes being optional/additional. The ECU can work both with the locations of the head and with a relative angle of the head with respect to the driver's display. If the driver moves his/her head forward, he/she is increasing the alpha angle and is expanding the additional extended view (220) to the left in the display, at least in a straight direction according to the horizontal axis, x.

Figure 12:
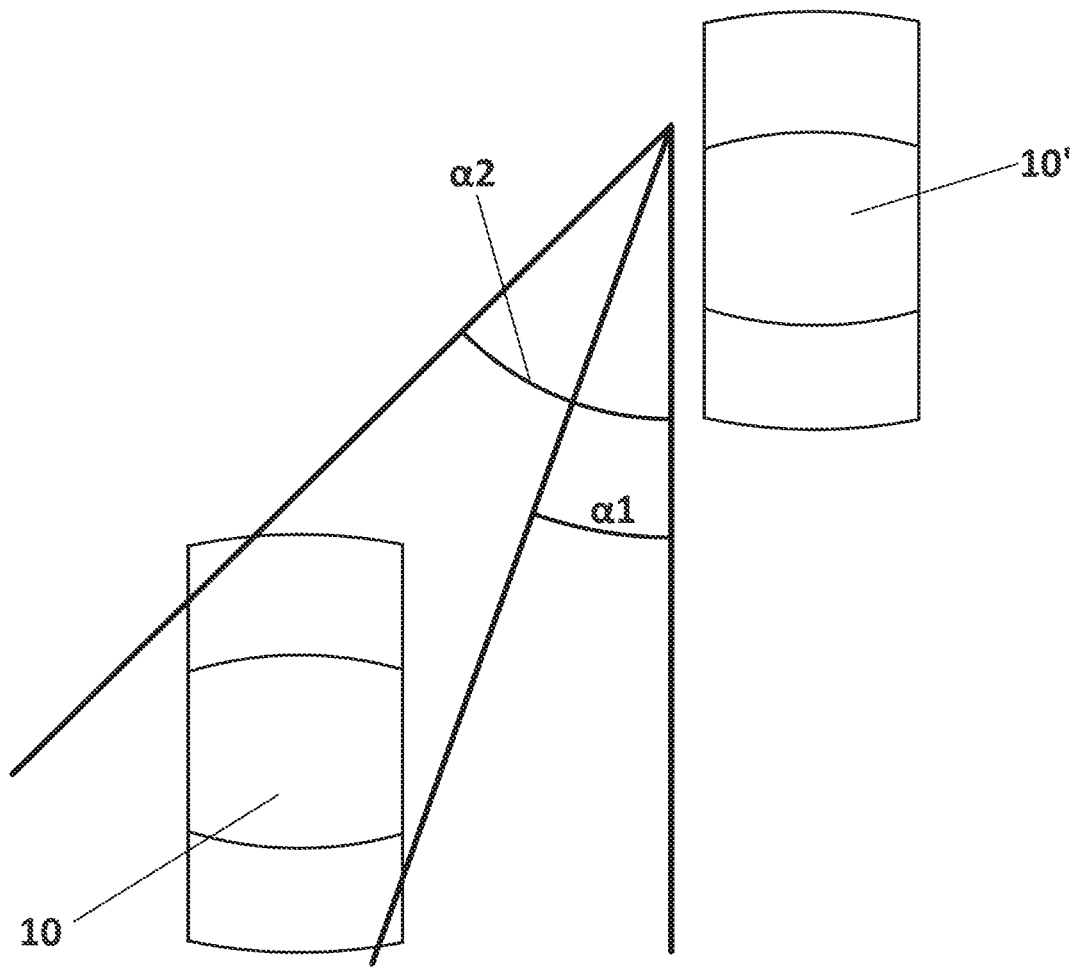
FIG. 12 shows, from a top view, the aperture angle of the FOV of the image region to be displayed increasing as the driver's head moves forward for overtaking another vehicle.

FIG. 12 shows from a top view the increase of the aperture angle ($\alpha 1$, $\alpha 2$) as the driver's head moves forward for overtaking another vehicle (10'). At a first position (E51) of the driver's eyes/head, the aperture angle has an initial value ($\alpha 1$). When the driver of the vehicle (10) starts to overtake the other vehicle (10'), the driver's head goes to a second position (E52) and the aperture angle takes another value (α2), being α2>α1. This increase of the aperture angle is translated into an increase in the horizontal length of the displayed image region (210), as shown in FIG. 11, because the extendable second crop (220) is added to the first crop (210') and expanded outward horizontally.

Figure 13:
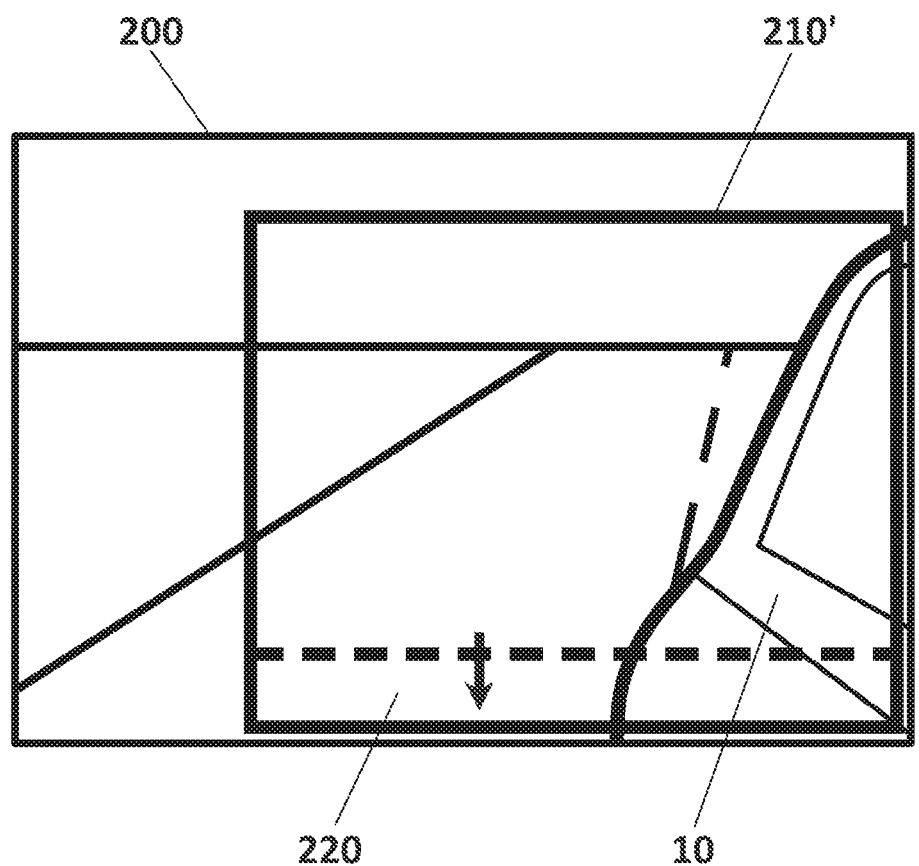
FIG. 13 shows the displayed image vertically expanding downwardly as the driver's head moves a few millimeters upward, e.g., to see the ground.

FIG. 13 shows another option for the extendable second crop (220) added to the first crop (210') to form the displayed image region (210), which can be vertically expanded downwardly when the driver's head moves a few millimetres upward, e.g., for parking to see the ground and check any curb or another obstacle.

Figure 14:
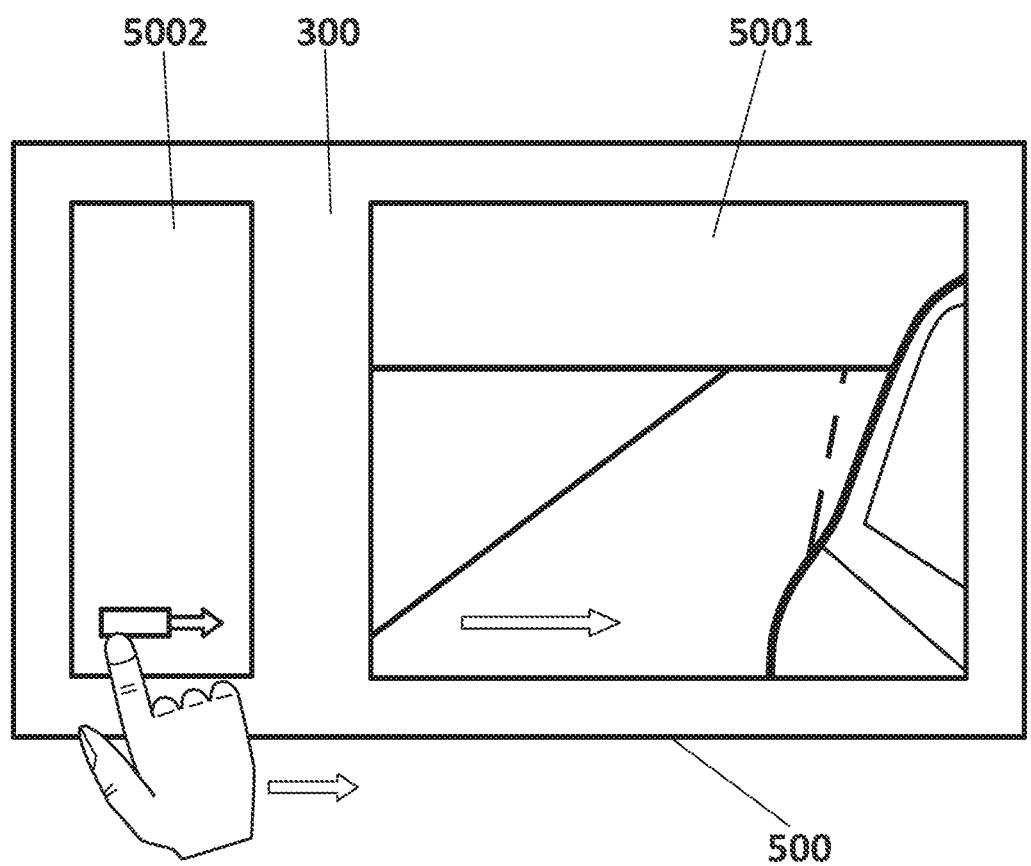
FIG. 14 shows the CMS providing an electronic display device with two different portions.

FIG. 14 shows the CMS is provided with an electronic display device (500) having two different portions: a first portion (5001) in which the first crop 210' is displayed, and a second portion (5002) in which the additional extended view (220) is displayed. According to one example, the display device (500) is one single screen, preferably a touch screen. According to another example, the display device (500) comprises two different screens. Having two screens, the first portion (5001) distinguished by the ECU may be implemented in the first screen, which can be touchless and then cheaper, and the second portion (5002) may be implemented in the second screen, which can be touch-sensitive. The second portion (5002) is preferably smaller than the first portion (5001). One technical advantage is the cost of non-touch-sensitive screens. Further, the driver may perform a "touch & drag" operation in the second portion (5002) so as to move the display image region (210). It may be advantageous for the initial calibration of the camera monitoring system, CMS, when the driver is about to start driving. The technical advantage of doing so is that the first portion (5001) does not get dirty. Further, the second portion (5002) may display the parameters related to brightness and/or contrast and/or color of the first portion (5001). As explained, the second screen only displays the additional extended view (220) when the ECU determines the additional extended view (220) has to be displayed, whereas the first screen shows permanently the first crop (210') while the engine of the vehicle (10) is on. For example, the driver can calibrate the CMS so that a movement of the driver's thumb indicating the OK symbol can switch on the additional extended view (220). The first crop (210') displayed on the first screen is fixed (i.e., does not vary by changing the location of the driver's head), so it is ensured to display at least a portion of the exterior side of the vehicle (10) at all times when the engine is running even when the driver's head is moved forward.

As shown in FIG. 14, in order to implement the aforementioned two portions (5001, 5002) in the display device (500), the CMS further comprises a frame (300) covering at least partially the display device (500). This frame (300) has the same dimensions as the display device (500) or significantly larger to cover at least the entire display device (500). The frame (300) is a cover, preferably made of plastic or glass, which also protects the display device (500) from impacts and damages, since the touch screen may be relatively fragile. The frame (300) may be partially tinted. Preferably, the tinting is black. The frame (300) does not allow all the light emitted by the display device (500) can pass through. Therefore, the driver does not see the light emitted by the display where the frame is tinted, i.e., silkscreen. The frame (300) is placed, for example, on top of the touch screen, and so what the user sees is the "frame", since it is placed between the screen and the user.

Figure 15:
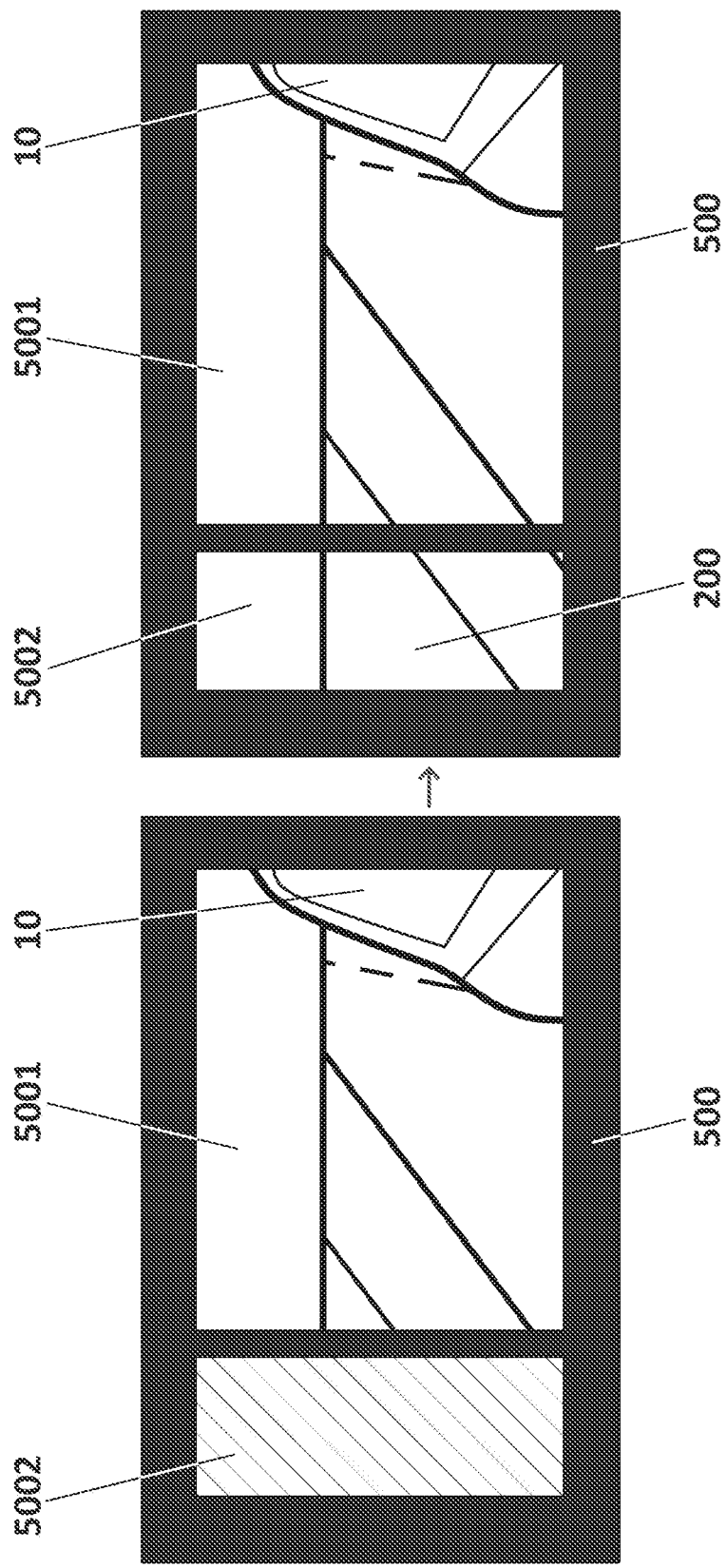
FIG. 15 shows the CMS with a two-states (switched on/off) operation of the electronic display, in which the second image region is displayed (switched on) in full on the second portion when a head movement is detected and conversely the second image region is not displayed at all (switched off) when the driver's head is detected to be back to the original position.

Alternatively, as shown in FIG. 15, a third embodiment of the present invention comprises two states of operation for the display device (500): a first state corresponds when the gesture detector detects that the detected driver's head passes a threshold, e.g., when overtaking, then the second image region as an additional extended view (220) is displayed (i.e., switched on), as shown in the right picture of FIG. 15, in full on the second portion (5002). A second state corresponds when the second image region (220) is not displayed at all when the driver's head is detected to be back to the original position (i.e., normal driving), i.e., the second portion (5002) is switched off, as shown in the left picture of FIG. 15. A difference between the second embodiment and the third embodiment is that the extended view of the second embodiment is continuously extended or retracted, whereas the third embodiment is entirely displayed (i.e., first state) or not displayed (i.e., second state). Optionally, the ECU may generate a black image for the second state. An ordinary skill person in the art will recognize that dark colours such as black have low power consumption if displayed in LED screens such as an OLED display device.

As explained, since the FOV is being changed (i.e., adjusted), actually by (i) moving the image region (210) or crop, or alternatively by (ii) expanding and contracting the additional extended view (220), as explained, based on the movement of the driver's head, another further—fourth—embodiment is related to sensitivity, i.e., the speed of changing the FOV (the speed of moving the crop or increasing the size of the additional extended view). The proposed CMS allows the user to calibrate the sensitivity; for example, if the driver moves his/her head 10 centimetres, the crop is moved 10 millimetres; but if the driver moves his/her head 20 centimetres, the crop is only moved 10 millimetres. In another example, by moving his/her head 30 centimetres forward, a first driver wants the displayed image to be moved only 1 centimetre horizontally within the captured image, whereas by moving his/her head 30 centimetres, a second driver may want the displayed image to be moved 2 centimetres horizontally within the captured image. That is, not all the head movements produce the same displacement of the crop and the system can be customized according to the driver's preferences for controlling the speed of the displacement/movement (panning). This sensitivity calibration also applies to the second embodiment, in which the aperture (a) of the image region (210) increases by expanding (extending/lengthen) the additional extended view as the detected relative angle increases.

The movement of the driver's part of the body detected by the sensor is at least in the driving direction of the vehicle, and the panning is at least linear and horizontal accordingly. Preferably, it can also be in the vertical plane (perpendicular to the ground plane), and the panning movement is linear and vertical, or a combination of horizontal and vertical, i.e. diagonal, accordingly.

The movement of the crop, based on the head movements, is performed by comparing a reference position of the driver's head with its current position. Both positions can be calculated for the driver's head or any other part of the driver's body or head, preferably the face. Therefore, the reference position is not calculated with respect to a fixed element (of the car), but with respect to a part of the driver's upper body. To control/customise the system sensitivity in moving the crop, the system is calibrated before the driver starts driving. The system is configured to save the driver's personal settings in order to detect each user and load his/her stored profile. Therefore, while driving, the movement of the displayed image change according to the sensitivity customization (calibration). That is, by some drivers moving their head a lot (while driving), the FOV will change a few little, whereas other drivers will desire greater sensitivity, in which the FOV can change significantly by moving their head just a little. The user can calibrate (customise the sensitivity of) the camera monitoring or vision system (CMS) of any of the electronic rear-view mirrors (interior and/or any of the side mirrors).

Customization of the sensitivity of the proposed system comprises, according to a possible example, the following steps:

Start sensitivity calibration: When the driver buys the vehicle or drives it for the first time, a certain—initial—position of the head is associated with the image he/she wants to see in the display, the displayed image (crop). This is performed while the driver moves his/her head and eventually selects the image which the driver wants to be displayed when his/her head is in the usual position for driving. The selection of the image on the display can be carried out using a touch screen of the display device, for example by clicking on virtual buttons, or making a "touch and drag". Alternatively and very advantageously, the selection of the image associated with the initial position of the driver's head can be performed using the gesture detector, which is capable of detecting the position of the driver's hands/fingers, so that the driver does not need touch the screen of the display device. The sensor of the gesture detector is capable of capturing gestures/movements of any part of the driver's body (hands included). Thus, the gesture detector transmits the movements of the fingers/hands to the ECU, which moves the crop, until the driver selects the determined crop position on the display.

Once the image associated with the first (initial) position of the driver's head is selected, the driver moves his/her head to a second position. For example, the position at which the head is when the driver wants to overtake with the vehicle. And as before, the driver moves the crop on the display (using a touch screen, a joystick, or preferably the gesture detector).

Finally, and as an additional option for sensitivity calibration, the driver can select whether the variation of the crop at the intermediate points follows a linear (proportional) relationship or, preferably, a non-linear relationship (e.g., Table 1).

In an embodiment, the gesture detector is configured to perform the "calibration", wherein, for initial "calibration", the user/driver customises the desired sensitivity. To that end, the gesture detecting sensor detects a first position (e.g., of the head) and a second position (of the head). The driver selects/determines the FOV associated with the first position (determines the position of the crop) and a second FOV of the second position (determines the adjusted position of the crop). The ECU determines the displacement of the displayed image/crop. While driving, the sensor detects the position of the driver's head with respect to the initial reference position. Based on the comparison of the reference position (first position) with the second position, the displayed image is shifted (moved). Both positions are dynamic, they have not fixed values because the driver can change the initial reference position of his/her head. The driver associates the first position with a given FOV and the second position with another FOV.

The calibration is optional and carried out before driving: the user sits in the driver's seat and in a first position, for example, in his/her usual driving position, selects a first FOV (location of the crop) to be seen on the display. Then a relationship is established between the first position and the associated first FOV (location of the crop) which the driver wants to see when he/she is in the position. Then, the driver changes the position of the body/head, for example, he/she moves his/her head forward, in a second position corresponding to the position that the driver would occupy if he/she were about to change lane to pass (i.e., overtake) the car in front of him/her. Then, the driver selects the second FOV that he/she wants to see on the display when he/she is in the second position. Therefore, the ECU has at least two positions of the driver's body/head, with their respective first and second FOVs. At this point, the ECU establishes a (linear or non-linear) relationship based on these positions input by the driver, i.e., if the driver is in an intermediate position while driving, the crop (displayed image) moves in an intermediate position between the positions corresponding to the first FOV and the second FOV. If this relationship is linear, this entails that the variation between the first position and the second position is proportional, but it may also not be proportional.

The reference position (first position) can be calculated as follows:

(i) A position preselected by the driver, that is, the calibration is customized. Optionally, the driver is detected through facial recognition and his/her preferences/settings are loaded.

(ii) The measured head position (e.g., a mean or a mode of the head positions) during a pre-configured time period (e.g., in the first 20 seconds).

(iii) The average (mean) value of head displacements (or the mode value) permanently calculated, discarding head movements which are unlikely to be a reference position. That is, there is not any time interval to collect measurements of head positions as in the preceding point, but the mean or the mode (or any other equivalent statistical parameter) is dynamically calculated at the current time. If the head movement at the current time corresponds to a FOV adjustment for a driving maneuver (e.g., the head moves forward), the head movement is discarded for the calculation of the reference position, but it is considered as a "current position". Erratic or sudden head movements, head displacements that are far from the mean/mode, are discarded. When an unstable head position is detected, the times of head detection per second can be increased, That is, when there is a sudden movement or unusual locations of the head (far from the mean/mode) the number of detections increases so as to determine the reference position. Optionally, when the sudden movements are present, they are not to be taken into account for calculating the reference position.

In general, the ECU has several ways to determine the movement of the crop (digital panning):

(i) Based on the distance between the second position (current position) and the first position (reference position), the ECU consults a lookup table which stores the detected positions.

(ii) The ECU calculates the difference in relative angle between the head and the display. The ECU is configured to move the displayed image/crop within the captured image on the basis of the variations in the angle of the head with respect to the display.

(iii) Comparing to a pre-configured threshold: to move the crop, the detected movement of the head must exceed the threshold. This enables the panning only when the driver is actually deliberately moving his/her head, for example, to pass another car. Thus, the displayed image (crop) is not permanently (even if it is just a little) moving around.

(iv) Based on the driver's gaze (i.e., considering which point the driver is looking at). That is, the crop movement is not (only) based on the movement of the driver's head, but also on whether he/she is looking at the display. Taking into account the driver's gaze prevents the FOV from being changed when the driver's head movement happens because the driver scratches his/her back, for example. Moreover, the driver's gaze has to be considered if the display is in a head mounted device (e.g., AR glasses).

The sensor or gesture detector is, for example, a camera (although the sensor or gesture detector may be radar or another technology). The ideal situation is for it to always find a representative point of the face/body. If it is a camera, it can detect any facial expression, especially the eyes, so it would find the midpoint between the two eyes. If it is radar, detection could be done by finding the outline of the face, and then finding the midpoint (height of the head divided by two, and width of the head divided by two).

Furthermore, the movement of the crop, the speed of this movement (sensitivity, as explained before) and/or the size of the crop can be changed depending on the yaw angle, pitch angle or roll angle, the turn signal, or a movement of the steering wheel.

A last example of the proposed camera monitoring system, CMS, comprises:
- image capturing device located at an exterior mounting assembly of the motor vehicle (10), for capturing a raw image (400) from an exterior FOV of the vehicle (10) extending at least rearward outside the vehicle (10) and encompassing a portion of the exterior part of the vehicle (10); preferably, the image capturing device comprises at least a camera associated with an exterior rear-view mirror on the left side or right side of the vehicle (10);
- an electronic control unit, ECU, connected to the image capturing device, the ECU (500) obtaining a captured image (200) from the raw image (400);
- an electronic display device connected to the ECU for displaying an image comprising at least one image region (210) of the exterior FOV, the at least one image region (210) being selected by the ECU from the captured image (200), the electronic display device being located inside the vehicle (10) and to be used by a driver (11) of the vehicle (10);
- and the CMS further comprises a gesture detector configured to obtain at least one position of at least one part of the driver's body, wherein the ECU is configured to adjust the at least one image region (210) of the exterior FOV based on the at least one obtained position and the display device is configured to display the adjusted image region (210) of the exterior FOV; and wherein the obtained captured image (200) from the raw image (400) comprises a symmetrical image of the raw image (400) with respect to a vertical axis; and wherein the adjusted image region (210) comprises an aperture angle ($\alpha$, $\alpha1$, $\alpha2$) defined as an angular extent of the displayed exterior FOV and:
- either the aperture angle ($\alpha$) is fixed independently of the relative, alpha, angle (X1, X2);
- either the aperture angle ($\alpha1$, $\alpha2$) is increased as increasing the relative, alpha, angle (X1, X2);
- wherein the relative angle (X1, X2) is defined as the angle between the position of the part of the driver's body and:
  - (i) either the image capturing device, wherein the image capturing device is located on the left side or right side of the vehicle (10);
  - (ii) either the electronic display device.

The adjusted image region (210) is smaller than the captured image (200) and, optionally, is not centered on the captured image; instead, the image region (210), which is displayed by the electronic display device, is located at an inner, right or left, side of the captured image, so as the driver is provided with a path on the display to:
- (i) move the selected image region (210) within the captured image (200); or alternatively,
- (ii) extend or retract the length of an additional extended view (220) outwardly along the horizontal axis of the captured image (200), according to the determined body movement in the driving direction; and, in a particular example, the length (L2) of the path is at least 20% of the length (L1) of the image region (210, 210') before starting to be adjusted within the capture image (200), and the length (L2) of the path is at least twice as long as length (L3) of the space defined at the other side of the image region (210, 210') before starting to be adjusted within the capture image (200).

The image capturing device (or camera) of the motor vehicle (10) for capturing a raw image (400) from an exterior field of view of the vehicle (10) may operate at least at 30 frames per second, optionally, at least at 60 frames per second for all the examples described in the present application.

Note that in this text, the term "comprises" and its derivations (such as "comprising", etc.) should not be understood in an excluding sense, that is, these terms should not be interpreted as excluding the possibility that what is described and defined may include further elements, steps, etc.

What is claimed is:

1. A camera monitoring system for a motor vehicle comprising:
   an image capturing device including an image sensor located at an exterior mounting assembly of the motor vehicle, for capturing a raw image from an exterior field of view (FOV) of the vehicle, wherein the FOV extends at least rearward outside the vehicle and encompasses a portion of an exterior part of the vehicle;
   an electronic control unit (ECU) connected to the image capturing device, the ECU obtaining a captured image from the raw image; and
   an electronic display device connected to the ECU for displaying an image that includes at least one image region of the exterior FOV, the at least one image region being selected by the ECU from the captured image, the electronic display device being located inside the vehicle and to be used by a driver of the vehicle; and
   a gesture detector configured to obtain at least one position of at least one part of a driver's body,
   wherein the captured image obtained by the ECU includes a symmetrical image of the raw image with respect to a vertical axis of the captured image, the symmetrical image being generated by the image sensor of the image capturing device,
   wherein the ECU is configured to move the at least one image region within the capture image according to a relative angle (X1, X2) defined as the angle between the at least one obtained position of the part of the driver's body and the electronic display device, wherein, for a first relative angle (X1) defined with respect to a first obtained position and a second relative angle (X2) is greater than first relative angle (X1), the ECU is configured to move the at least one image region at least to a left along a horizontal axis of the captured image if the vehicle is for right-hand traffic and at least to a right along the horizontal axis of the capture image if the vehicle is for left-hand traffic, and wherein the exterior FOV is adjusted based on the at least one obtained position and the electronic display device is configured to display the adjusted exterior FOV in the at least one image region.

2. The camera monitoring system of claim 1, wherein the at least one image region comprises an aperture angle (α), the aperture angle (α) being defined as an angular extent of the displayed exterior FOV, and wherein the aperture angle (α) of the at least one image region is:

fixed independently of the relative angle (X1, X2) of the part of a driver's body, or increased as increasing the relative angle (X1, X2) of the part of the driver's body.

3. The camera monitoring system of claim 1, wherein the at least one image region is smaller than the captured image and is not centered on the captured image.

4. The camera monitoring system of claim 3, wherein the at least one image region is located at an inner, right or left, side of the captured image, the at least one image region being at a right inner side if the vehicle is for right-hand traffic or being at a left inner side if the vehicle is for left-hand traffic.

5. The camera monitoring system of claim 1, wherein the image capturing device operates at least at 30 frames per second.

6. The camera monitoring system of claim 1, wherein the ECU is configured to select one single image region and to move a single image region within the captured image at least horizontally along a horizontal axis of the captured image, according to the at least one obtained position.

7. The camera monitoring system of claim 6, wherein the gesture detector comprises a sensor configured to:

detect a first position of at least one part of the driver's body corresponding to a reference position of the detected part of the driver's body; and detect a second position of the at least one part of the driver's body corresponding to a current position of the detected part of the driver's body;

wherein the ECU is further configured to determine a movement of the detected part of the driver's body based on comparing the second position against the first position at least along a driving direction.

8. The camera monitoring system of claim 7, wherein the ECU is further configured to move the image region within the captured image at least outwardly horizontally along a horizontal axis of the captured image, according to the determined body movement in the driving direction.

9. The camera monitoring system of claim 8, wherein the ECU is further configured to move the displayed image region within the captured image at least outwardly horizontally along the horizontal axis of the captured image when the relative angle X2 is greater than the relative angle X1.

10. The camera monitoring system of claim 1, wherein the ECU is configured to split the at least one image region for displaying the exterior FOV into a first image region and an additional extended view, and wherein the display device is configured to display the additional extended view next to the first image region.

11. The camera monitoring system of claim 10, wherein the ECU is configured to adjust a size of the image region by extending or retracting progressively a length of the additional extended view according to the obtained position of the part of the driver's body, while the first image region remains unchanged both in size and location.

12. The camera monitoring system of claim 10, wherein the ECU is configured to operate the electronic display device according to one of two states: (i) when a change in the obtained position of the part of the driver's body is detected by the ECU, the additional extended view is displayed in a first state; and (ii), when the obtained position of the part of the driver's body is detected by the ECU to be equal to an initial position, the additional extended view is not displayed.

13. The camera monitoring system of claim 1, wherein the electronic display device is in a head-mounted device.

14. The camera monitoring system of claim 1, wherein the ECU is further configured to determine a sensitivity of the camera monitoring system by performing the following steps:

selecting a first location of the image region within the captured image corresponding to a first position of at least one part of the driver's body;

selecting a second location of the image region within the captured image corresponding to a second position of the at least one part of the driver's body;

defining a relationship between the selected first location and the selected second location of the image region linear relationship or a non-linear; and determining the sensitivity by selecting intermediate locations of the image region according to the defined relationship, the intermediate locations corresponding to positions of the driver's body which are intermediate between the first position and the second position.

15. The camera monitoring system of claim 1, wherein the image capturing device comprises at least a camera associated with an exterior rear-view mirror located on a left side or a right side of the vehicle and/or at least a camera associated with an interior rear-view mirror, wherein the FOV associated with an exterior rear-view mirror further extends at least sideward outside the vehicle and encompasses a portion of an exterior lateral side part of the vehicle.

16. A method of displaying images of a camera monitoring system for a motor vehicle, the method comprising:

capturing a raw image, by an image capturing device located at an exterior mounting assembly of a motor vehicle, of an exterior field of view (FOV) of the vehicle, wherein the FOV extends at least rearward outside the vehicle and encompasses a portion of an exterior part of the vehicle;

performing a symmetry image of the raw image;

providing the symmetry image to an electronic control unit (ECU);

selecting, by the ECU, at least one image region from a captured image, where the at least one image region is smaller than the symmetry image and the captured image which is obtained by the ECU, wherein the captured image comprises the symmetrical image of the raw image;

displaying, by an electronic display, the at least one image region;

obtaining, by a gesture detector, at least one position of at least one part of a driver's body;

adjusting the at least one image region based on the at least one obtained position;

displaying the adjusted at least one image region;

obtaining by a gesture detector, at least one position of at least one part of the driver's body;

moving, by the ECU, the at least one image region within the captured image according to a relative angle (X1, X2) defined as the angle between the at least one obtained position of the part of the driver's body and the electronic display device, wherein, for a first relative angle (X1) defined with respect to a first obtained position and a second relative angle (X2) with respect to a second obtained position, when the second relative angle (X2) is greater than the first relative angle (X1), wherein the ECU moves the at least one image region at least to a left along a horizontal axis of the captured image in response to the vehicle being for right-hand traffic and at least to a right along a horizontal axis of the capture image in response to the vehicle being for left-hand traffic, wherein the exterior FOV is adjusted based on the at least one obtained position; and displaying, by the electronic display, the adjusted exterior FOV in the moved, at least one, image region.

17. The method of claim 16, wherein the step of adjusting the at least one image region comprises moving, by the ECU, the at least one image region at least horizontally within the symmetry image based on the at least one obtained position of the driver's body.

18. The method claim 16 further comprising
selecting, by the ECU, a first location of the at least one image region within the captured image corresponding to a first position of the, at least one part, of the driver's body;

selecting, by the ECU, a second location of the at least one image region within the captured image corresponding to a second position of the, at least one part, of the driver's body;

defining, by the ECU, a relationship between the selected first location and the selected second location of the at least one image region linear relationship or a non-linear;

and determining the sensitivity, by the ECU, by selecting intermediate locations of the at least one image region according to the defined relationship, the intermediate locations corresponding to positions of the driver's body which are intermediate between the first position and the second position, wherein the sensitivity corresponds to a speed at which the FOV is changed.

* * * * *